(12) United States Patent
Tapia

(10) Patent No.: US 12,452,332 B2
(45) Date of Patent: Oct. 21, 2025

(54) RESOURCE MANAGEMENT IN A BIG DATA ENVIRONMENT

(71) Applicant: Tupl Inc, Bellevue, WA (US)

(72) Inventor: Pablo Tapia, Snoqualmie, WA (US)

(73) Assignee: TUPL, INC., Snoqualmie, WA (US)

( * ) Notice: Subject to any disclaimer, the term of this patent is extended or adjusted under 35 U.S.C. 154(b) by 0 days.

(21) Appl. No.: 17/185,847

(22) Filed: Feb. 25, 2021

(65) Prior Publication Data

US 2021/0185117 A1 Jun. 17, 2021

Related U.S. Application Data

(63) Continuation of application No. 14/800,648, filed on Jul. 15, 2015, now abandoned.

(60) Provisional application No. 62/193,002, filed on Jul. 15, 2015, provisional application No. 62/025,961, filed on Jul. 17, 2014, provisional application No. 62/025,958, filed on Jul. 17, 2014, provisional application No. 62/025,453, filed on Jul. 16, 2014, provisional application No. 62/025,441, filed on Jul. 16, 2014.

(51) Int. Cl.
*H04L 67/10* (2022.01)
*H04L 67/125* (2022.01)
*H04W 72/04* (2023.01)

(52) U.S. Cl.
CPC .......... *H04L 67/10* (2013.01); *H04L 67/125* (2013.01); *H04W 72/04* (2013.01)

(58) Field of Classification Search
CPC ..... H04W 28/16; H04W 52/18; H04W 24/10; H04W 68/005; H04W 36/14; H04W 52/241; H04W 36/22; H04W 16/14; H04W 72/04; H04L 67/10; H04L 67/125
USPC ........................................................ 709/204
See application file for complete search history.

(56) References Cited

U.S. PATENT DOCUMENTS

| | | | |
|---|---|---|---|
| 9,699,049 B2 | 7/2017 | Gupta et al. | |
| 9,843,486 B2 | 12/2017 | Feller et al. | |
| 9,853,882 B2 | 12/2017 | Vasseur et al. | |
| 2004/0250166 A1* | 12/2004 | Dahlquist | G05B 23/0278 714/37 |
| 2009/0063387 A1 | 3/2009 | Beaty et al. | |

(Continued)

OTHER PUBLICATIONS

U.S. Appl. No. 15/212,061, Office Action, mailed Feb. 15, 2018, 15 pages.

(Continued)

*Primary Examiner* — Tan Doan
(74) *Attorney, Agent, or Firm* — Hayes Soloway P.C.

(57) ABSTRACT

A method and system to automatically analyze, diagnose and repair the state of a network utilizing big data and machine learning techniques. Data from disparate sources related to a first network element is received by a processing layer. Contextual information from a measurements megastore related to the first network element and other network elements is retrieved. The data from the disparate sources and the contextual information is analyzed by an intelligence layer comprising big data and machine learning techniques. Upon determining, by the intelligence layer, that a predetermined condition is met or a predetermined threshold is exceeded, a notification is provided to the first network element. Over time, the intelligence layer adapts to learn based on growing amounts of historical data.

23 Claims, 12 Drawing Sheets

(56) References Cited

U.S. PATENT DOCUMENTS

| | | | |
|---|---|---|---|
| 2011/0136533 A1* | 6/2011 | Senarath | H04W 52/244 |
| | | | 455/522 |
| 2012/0072267 A1 | 3/2012 | Gutierrez, Jr. et al. | |
| 2013/0003591 A1* | 1/2013 | Novak | H04W 88/04 |
| | | | 370/252 |
| 2013/0083678 A1 | 4/2013 | Yin | |
| 2013/0084828 A1* | 4/2013 | Forte | H04L 63/083 |
| | | | 455/410 |
| 2013/0145024 A1 | 6/2013 | Cao et al. | |
| 2013/0145027 A1 | 6/2013 | Parthasarathy et al. | |
| 2013/0203433 A1* | 8/2013 | Luna | H04W 28/06 |
| | | | 455/452.1 |
| 2014/0128123 A1 | 5/2014 | Matsunaga | |
| 2014/0379619 A1 | 12/2014 | Permeh et al. | |
| 2015/0088827 A1* | 3/2015 | Xu | G06F 3/0619 |
| | | | 707/634 |
| 2016/0028616 A1 | 1/2016 | Vasseur et al. | |
| 2016/0088006 A1 | 3/2016 | Gupta et al. | |
| 2016/0277265 A1 | 9/2016 | Paradela | |
| 2017/0353991 A1 | 12/2017 | Tapia | |
| 2017/0364819 A1* | 12/2017 | Yang | H04L 41/16 |
| 2018/0130145 A1* | 5/2018 | Tapia | G06N 5/01 |
| 2018/0131559 A1* | 5/2018 | Tapia | H04Q 3/0062 |

OTHER PUBLICATIONS

International Search Report and Written Opinion' for Application No. PCT/US2015/040809 mailed Aug. 26, 2016, 10 pages.
Youping Zhao et al., "Radio Environment Map Enabled Situation-Aware Cognitive Radio Learning Algorithms," In: Proceedings of Software Defined Radio (SDR) Technical Conference, Nov. 2006.

\* cited by examiner

RESOURCE MANAGEMENT IN A BIG DATA ENVIRONMENT

CROSS REFERENCE TO RELATED PATENT APPLICATIONS

This patent application is a Continuation of U.S. application Ser. No. 14/800,648, filed Jul. 15, 2015, which claims the benefit of U.S. Provisional Application No. 62/025,453, entitled "Intelligent Automatic Troubleshooting for Cellular Networks", filed on Jul. 16, 2014, to U.S. Provisional Application No. 62/025,441, entitled "Automatic Healthcare Monitoring System Leveraging Cellular Data Systems," filed on Jul. 16, 2014, to U.S. Provisional Application No. 62/025,961, entitled "Recommendation Engine for Network Insights", filed on Jul. 17, 2014, to U.S. Provisional Application No. 62/025,958, entitled "Radio Resource Management Architecture with Big Data Feeds," filed on Jul. 17, 2014, and to U.S. Provisional Application No. 62/193,002, entitled "Big Data Machine Learning Use Cases," filed on Jul. 15, 2015, which applications are hereby incorporated in their entirety by reference.

BACKGROUND

Presently, there is a revolution with the advent of big data techniques. Where prior data storage technologies, such as relational databases, were not sufficiently performant for large amounts of data, the advent of alternative data stores, based in the cloud, along with parallel processing algorithms, such as map-reduce, have made big data practical, performant, and cost effective. Furthermore, presently there have been recent advances in performant processing, including on large amounts of data to allow for real-time analysis of data or near-real-time analysis of data. One example includes Spark which provides such processing on Hadoop and leverages in-memory computation. Since big data provides statistically significant amount of data to analyze, big data lends itself well to existing machine learning techniques.

Big data and machine learning techniques, may be applied to a wide array of domains. One example is wireless communications which have experienced constant and significant transformation, guided by the continuous development of new network technologies and services, ushered in by the smartphone revolution and its countless applications. In this regard, wireless, such as cellular, systems have continuously evolved to cope with the increasing traffic demands, as well as the performance requirements imposed by these applications. The evolution of the wireless communication systems have typically taken place in isolated blocks, such as improving the performance at the radio level, or improving the architecture of the core network. While wireless communication has improved in the past decade, portions of the backend systems that support the networks still may include legacy architectures such as 3G and 2G networks.

This creates a tremendous operational challenge for network operators that need to grow their systems in a sustainable way. Due to the complexity associated with the use of different types of wireless devices, different types of data services, and disparate radio access networks, the cost of customer care is significantly increasing. Further, there have not been significant advances on improving the various communication systems that utilize contextual information from other systems and network elements in the network. In order to keep up with the ever changing and demanding network performance requirements, wireless providers must transform their maintenance cost structure while having the flexibility to address the ever-evolving customer demands in a cost effective way. The fluidity of the network requirements, the evolving customer needs, and the need to stay cost effective present challenges to the traditional approaches. It is with respect to these considerations and others that the present disclosure has been written.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

This disclosure generally relates to methods and systems of optimizing network elements. A scalable network backend is provided based on an open architecture that provides simplified access to data and increases automation. The operational efficiency and the overall cost of operation of the network is reduced by automation of functions and rationalization of hardware and software resources. The use of big data technologies, complemented with machine learning approaches, simplify and automate complex tasks, resulting in a more efficient network operation, improved customer quality and reduced subscriber churn.

In one aspect, the systems described herein provide an open platform where multiple data feeds from disparate sources are combined and processed in real time. In one embodiment, the system performs continuous monitoring and transmission of the monitored data from each network node, which can be synthesized at a centralized remote server. The synthesized data harvested from disparate sources is analyzed for potential problems and relevant solutions are provided.

In one aspect, data from disparate sources related to a first network element is received by a processing layer. Contextual information from a measurements megastore related to the first network element and other network elements is retrieved. The data from the disparate sources and the contextual information is analyzed by an intelligence layer. Upon determining, by the intelligence layer, that a predetermined condition is met or a predetermined threshold is exceeded, a notification is provided to the first network element.

Example System Architecture

Figure 1:
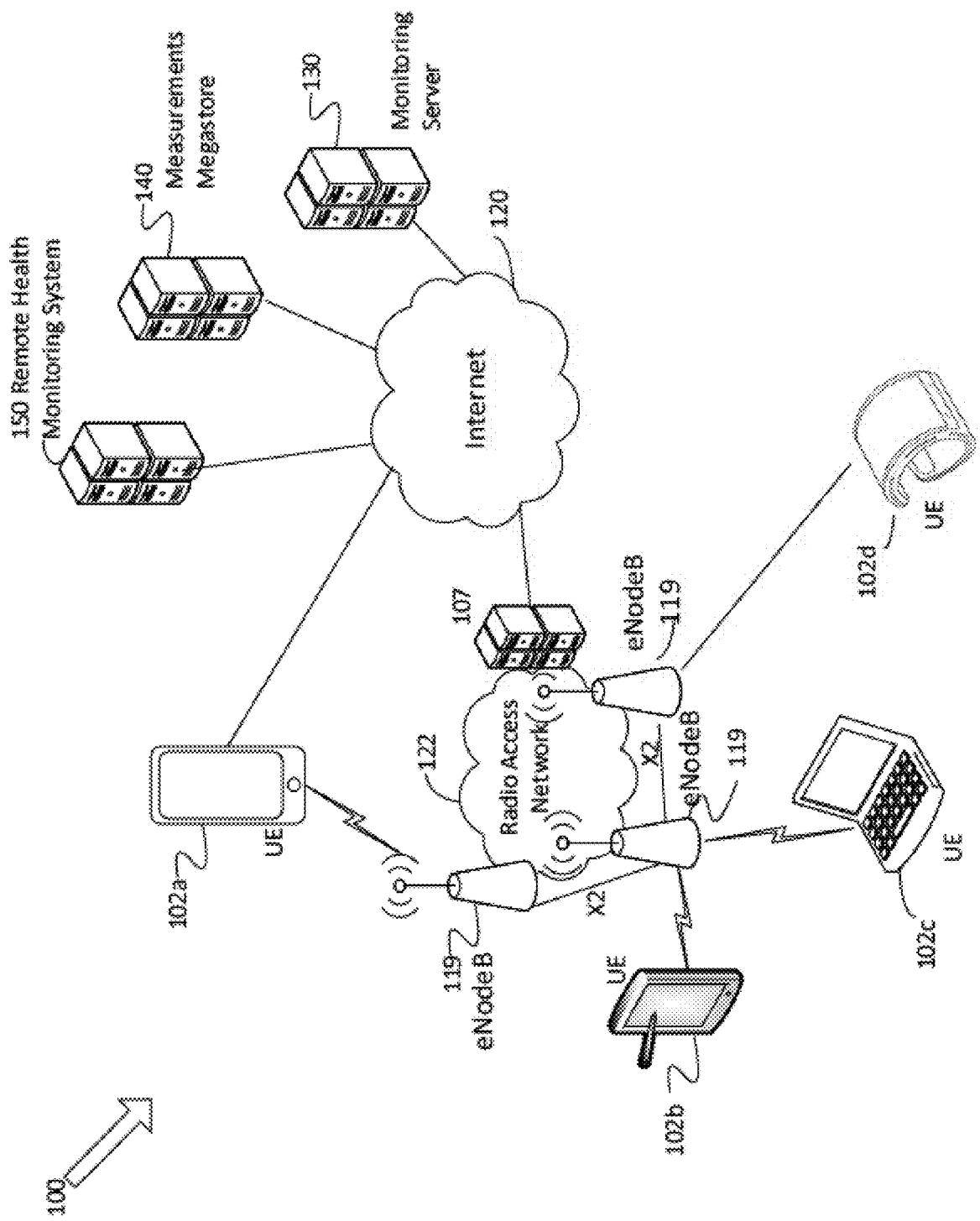
FIG. 1 illustrates an example network architecture for implementing a radio resource management architecture.

FIG. 1 illustrates an example network architecture for implementing a radio resource management architecture. FIG. 1 illustrates a mobile communication network 100 as may be operated by a carrier or service provider to provide a wide range of mobile communication services and ancillary services or features to its subscriber customers and associated mobile device users. The elements generally indicated by the reference numeral 100 are elements of the mobile communication network and are operated by or on behalf of the carrier. The mobile communication network 100 provides communications between user equipment (UE) 102a to 102d, as well as communications for the UE with networks and stations outside the mobile communication network 100.

For purposes of later discussion, several UE's appear in the drawing, to represent some examples of the devices that may receive various services via the mobile communication network 100. Today, UE's typically take the form of portable handsets, smart-phones, tablet computers, personal digital assistants (PDAs), and smart watches, although they may be implemented in other form factors, including consumer, business, and medical electronic devices, such as a wearable personal health monitor 102d. The mobile communication network 100 allows users of the UE's (e.g., customers or subscribers) to initiate communication, and receive information from the internet 120.

The mobile communication network 100 typically is implemented by a number of interconnected networks. Hence, the overall network 100 may include a number of Radio Access Networks (RANs) 122, as well as regional ground networks interconnecting a number of RANs and a wide area network (WAN) interconnecting the regional ground networks to core network elements, such as the Multimedia Messaging Service Centers (MMSCs). A regional portion of the network 100, such as that serving UE's 102b and 102c may include one or more RANs 122 (i.e., wireless communication network) and a regional circuit and/or packet switched network and associated signaling network facilities.

Physical elements of a RAN 122, operated by one of the mobile service providers or carriers, include a number of base stations represented in the example of FIG. 1 by an eNodeB 119 node. Such eNodeB 119 nodes may include a base transceiver system (BTS) that communicates via an antennae system at the site of the node and over the air-link with one or more of the UE's (102a to 102d) when the UE's are within range. Each eNodeB 119 node may include a BTS coupled to several antennae mounted on a radio tower within a coverage area often referred to as a "cell." The BTS is the part of the radio network that sends and receives RF signals to/from the UE's that the eNodeB node 119 currently serves. The radio access networks 122 carries the user communications for the UE's between the respective eNodeB 119 nodes and other elements with or through which the UE's communicate. In various embodiments, the radio that transmits communication signals (to one or more UE's) at each eNodeB may adjust the power output, bandwidth, etc., based on contextual information received from a measurements megastore 140 and/or alerts received from a monitoring server 130, discussed in more detail later. Individual elements such as switches and/or routers forming the radio access network 122 are omitted here for simplicity but are discussed in relevant part in the context of FIG. 2.

The radio access network portion 122 of the mobile communication network 100 connects to a public packet data communication network, such as the network commonly referred to as the "Internet" shown at 120. Packet communications via the radio access network 122 and the Internet 120 may support a variety of services through the network 100, such as providing contextual information from the measurements megastore and alerts from the monitoring server 130 to various network elements of the radio access network 122, as well as provide communications of text and multimedia messages, e-mail, web surfing or browsing, programming and media downloading (including audio and video), etc. to the UE's. For example, the UE's 102a to 102d may be able to receive messages from and send messages to user terminal devices, such as personal computers, either directly (peer-to-peer) or via various servers (not separately shown).

Of note for purposes of this discussion, many of the network messages and alerts discussed herein are sent to and received from various UE's using the radio access network 122 as well as elements of the radio access network 122. The Evolved Packet Core (EPC) of the radio access network 122 uses the concept of Evolved Packet System (EPS) bearer channels to route IP traffic from a gateway in the radio access network 122 to a UE. A bearer channel is an IP packet flow with a defined quality of service (QoS) between the Packet Data Network (PDN) Gateway (PGW) 107 and the UE (e.g., 13a to 13e).

The eNodeBs 119 are normally interconnected with each other by an interface known as "X2." The communication between each eNodeB includes Radio Resource Management (RRM), which covers all functions related to the radio bearers, such as radio bearer control, radio admission control, radio mobility control, scheduling, and dynamic allocations of resources to UEs in both uplink and downlink. In one aspect, the RRM can communicate with the measurements megastore 140 and/or receive messages from the monitoring server 130 to optimize its control features.

In one embodiment, network 100 includes a measurements megastore server 140, which is coupled for communication via the internet 120. The measurements megastore server stores contextual information (which may be from various sources) that is relevant to creating a more efficient connection (e.g., power consumption and/or speed) between a UE and the radio access network 122 as well as optimizing the components of the radio access network 122. For simplicity, the UE and the components of the radio access network are collectively referred herein as network elements. In various embodiments, the contextual information provided by the measurements megastore server 140 may include different types of information. For example, the contextual information may include application level information that is extracted via Deep Packet Inspection (DPI) that is received from one or more radio access networks 122. The contextual information at the server 140 may include UE terminal category (e.g., smart-phone, tablet, laptop, personal health monitoring device, etc.) information. The contextual information may also relate the capabilities of the network element, such as the maximum transmission bitrate and whether it is configured to be a low power device (configured for low power versus high performance). In one embodiment, the contextual information may provide the latest stored power status of the network element, which may be used to optimize the connection between the radio access network 122 and the respective UE.

Accordingly, the measurements megastore server 140 stores contextual information comprising disparate data from various sources. The data stored in the server 140 comprises information that can be used by the network elements of the wireless communication network 100 to provide a tailored optimization of the resources of the each network element, respectively. Alternatively or in addition, the monitoring server 130 can retrieve the contextual information from the measurements megastore 140, which includes information from the entire network 100, and analyze the contextual information together with data from disparate sources related to a network element to determine whether one or more predetermined conditions are met to trigger a message to the respective network element to optimize its performance in the context of the entire network 100. In contrast, a prior art cellular communication network may only utilize locally obtained metrics from a small subset of network elements such as network elements in the core network from the same vendor, or network elements deployed to implement a specific feature in the network, to decide how to optimally assign resources to each communication link of a UE 102 to the to the Radio Access Network 122.

For example, to establish a connection between a UE and an eNodeB, a prior art radio scheduler (at an eNodeB) may merely consider locally accessible information, such as the amount of data in the buffer of the respective UE, the identified radio quality, and the device capability, for the scheduler to determine the number of turns to assign to each link between the UE and the corresponding eNodeB. Even in more advanced prior art systems that may use Deep Packet Inspection (DPI) to, for example, assign a different quality level to a Skype® video call than to a File Transfer Protocol (FTP) transfer, the data that is extracted from the particular subsystem (i.e., wireless communication network) and is not shared between different network elements. However, this extracted data is limited and the resources allocated to a connection between an eNodeB and a corresponding UE is a guess at best. For example, in prior art systems, even if a radio scheduler of an eNodeB 119 may determine the terminal category of the terminal, the scheduler may still not be aware that the UE (e.g., 102d) is a machine to machine (M2M) module that needs to save as much battery life as possible.

In contrast, in one aspect, the system described herein allows the sharing of information across multiple eNodeB's 119 by storing contextual information at a measurements megastore server 140, which improves the capacity of the wireless communication network 100 by allocating, for example, the type of resources in a connection between a UE (e.g., 102d) and its corresponding eNodeB 119. Thus, the radio communication between a UE 102 and the radio access network 122 is better adjusted by making use of contextual information such as the type of customer, data plan, type of application, type of device, etc., which is provided by the measurements megastore 140 via the internet 140.

The monitoring server 130 and the measurements megastore 140 may be implemented in a distributed fashion on a number of similar platforms, to distribute the processing load and/or to provide additional functionality. For example, in one embodiment there may be a remote health (e.g., for humans) monitoring server 150 that is similar in configuration to the measurements megastore 140 but may be specialized in remote health monitoring. In this regard, the mobile communication network 100 provides an open platform where multiple data feeds from various UE's, such as the personal health monitor 102d, and disparate systems, such as other networks and servers, can be combined and processed in real time, for millions of individuals. Thus, the functionality described herein with respect to each of the servers 130, 140, and 150 can also be provided by one or multiple different servers. The actual operation of the mobile communication network 100 is described by way of example later.

Figure 2:
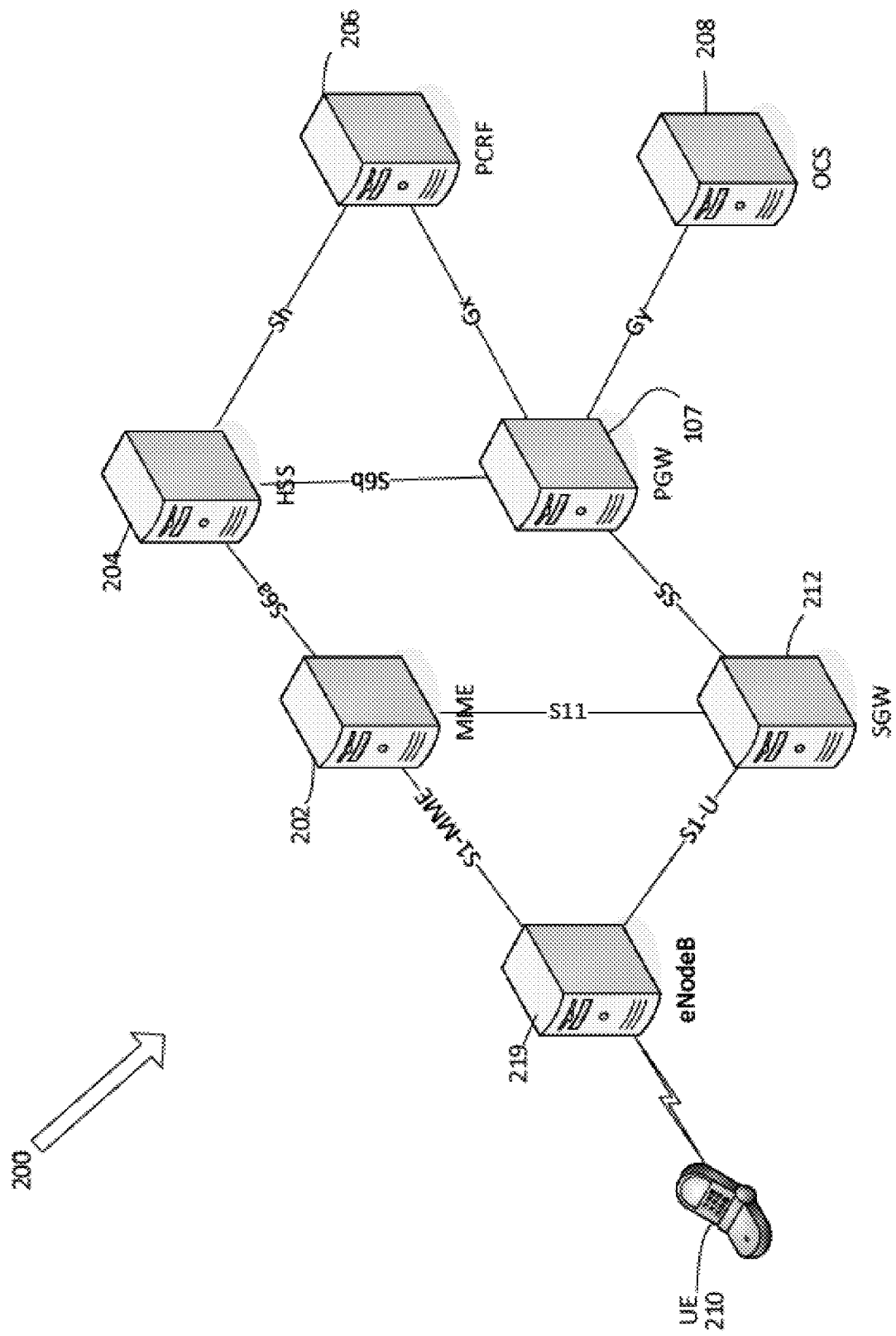
FIG. 2 illustrates an example high level interface block diagram of the elements of a radio access network.

FIG. 2 illustrates an example high level interface block diagram of the logical nodes of a radio access network 122. For example, the System Architecture Evolution (SAE) 200 is the core network architecture of Third Generation Partnership Project's (3GPP's) Long Term Evaluation (LTE) wireless communication standard. The SAE 200 has a flat, all-IP architecture with separation of control plane and user plane traffic. The SAE 200 system includes eNodeB 219, Mobility Management Entity (MME) 202, Home Subscriber Server (HSS) 204, the Policy Control and Charging Rules Function (PCRF) 206, and the Online Charging System (OCS) 208, which are part of the wireless communication network 100 and are each network elements. The eNodeB 219 can be viewed as an enhanced base station that acts as an interface between the UE 210 and the radio access network 122. MME 202 is a control-node for the communication access network. For example, it is used for idle mode mobile device tracking and paging procedure including retransmissions. It also provides bearer channel activation/deactivation process and selection of the serving gateway (SGW) 212 for the UE 210.

The Home Subscriber Server (HSS) 204 is a central database that contains user-related and subscription-related information. The HSS 204 provides features such as mobility management, call and session establishment support, user authentication and access authorization. For example, the HSS stores the Mobile Station International Subscriber Directory Number (MSISDN), the SIM-card identification information, and the like.

The Packet Data Network (PDN) Gateway (PGW) 107 provides connectivity from the UE 202 to external packet data networks. The Policy Control and Charging Rules Function (PCRF) 206 provides for policy control decision-making, as well as for controlling the flow-based charging functionalities in the Policy Control Enforcement Function (PCEF), which resides in the PGW 107. The PCRF 206 provides the QoS authorization that decides how certain data flow is treated in the PCEF and ensures that this is in accordance with the user's subscription profile.

The Serving Gateway (SGW) 212 routes and forwards data packets to the UE 210 through the MME 202. For example, a data packet can include a notification message that an account threshold is exceeded. The SGW 212 manages and stores mobile device parameters of the IP bearer channel service, including network internal routing information. Each of these network elements and others can be adjusted in performance based on the contextual data from the measurements megastore 140 and the alerts/messages of the monitoring server 130.

Radio Resource Management (RRM)

Figure 3:
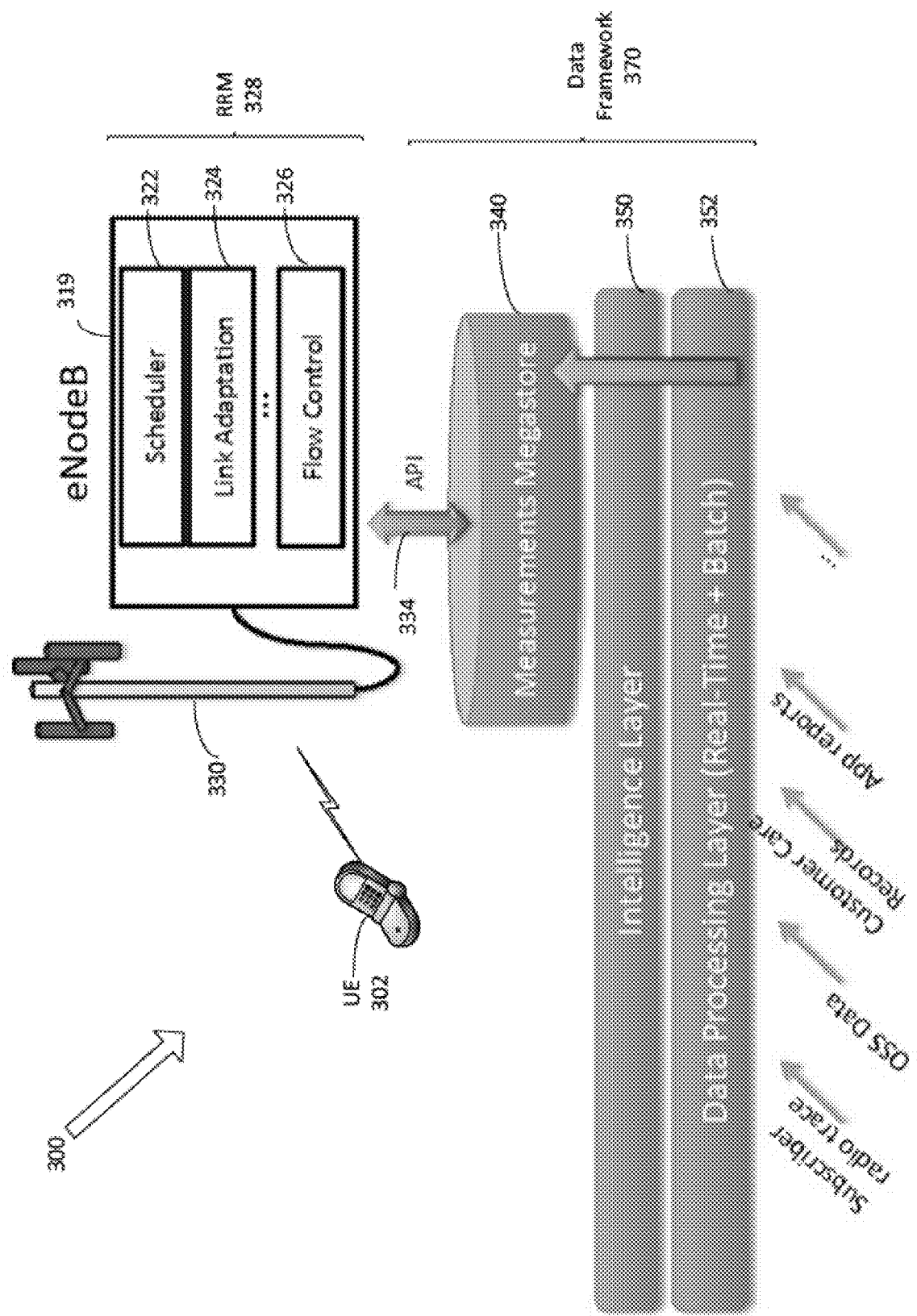
FIG. 3 is a block diagram showing a Radio Resource Management (RRM) module interacting with the data framework, consistent with an exemplary embodiment.

FIG. 3 is a block diagram showing a Radio Resource Management (RRM) module interacting with the data framework, consistent with an exemplary embodiment. The eNodeB 319 acts as a base station between one or more UE's (e.g., UE 302) and a radio access network. In the example of system 300, each eNodeB 319 includes a scheduler 322 that is configured to provide priority (e.g., allocating the number of turns) for data transmission between the UE 302 and the radio access network. The eNodeB 319 may include a link adaptation 324 unit that is configured to adjust the transmission mode to the channel conditions by, for example, adjusting modulation, coding, and selecting the appropriate time for transmission.

The eNodeB 319 may include a flow control 326 unit that is configured to control the flow of the operations of the eNodeB 319. The flow control 326 unit may provide admission control, coordination of the security signaling, compression, etc. The eNodeB includes an antenna 330 that is configured to communicate with various UE's (e.g. UE 302) within its wireless communication range.

The various components of the eNodeB 319 together comprise an RRM module 328, which is configured to communicate with the data framework 370 via an open Application Program Interface (API) 334. As illustrated in system 300, the data framework may include the measurements megastore 340, an intelligence layer 350 and a data processing layer 352. For example, the API 334 may facilitate communication between eNodeB 319 through the mobile communication network 100, via the internet 120 (of FIG. 2) to the measurements megastore 340. The data processing layer 352 may also receive localized information from the RRM 328.

As discussed before, the measurements megastore 340 is configured to store contextual information from various network elements, such as RRM modules of different eNodeB's, that can be shared by eNodeB 319 (and other eNodeB's configured to receive information from the measurements megastore 140), to better adjust the respective network element of the radio communication over the mobile communication network 100 of FIG. 1. Such optimization may include at least one of: admission control, scheduler, link adaptation, and power control procedures of the respective eNodeB.

In embodiment, in order to populate the contextual information in the measurements megastore 340, data is gathered by the data processing layer 352 of system 300. The data gathered by the processing layer may be from various sources, which may include data from elements of the mobile communication network 100, such as RRM module's coupled to the mobile communication network 100, as well as other servers (e.g., 130, 150) of the mobile communication network 100. The type of information received by the data processing layer 352 may include subscriber radio trace (e.g., location) provided by a UE, operations subsystem (OSS), customer care records, billing, application performance monitoring reports, and other information, including relevant information from the internet. In one embodiment, at least some of this information is provided by the measurements megastore 340.

In one embodiment, the data includes information from Deep Packet Inspection (DPI) provided by various eNodeB's. The data processing layer 352 may be performed in real time and/or in batch. The data may be provided to a network element (e.g., an RRM module 328 at an eNodeB 319) via a query performed by the network element in real time or may be pushed to the RRM module at predetermined time intervals or in response to a notification generated by the intelligence layer 350.

In one embodiment, the intelligence layer 350 may be configured to receive the information from the data processing layer 352 and determine whether predetermined one or more conditions are met. These conditions may be provided by a rule set stored in a memory of the intelligence layer. When a predetermined condition is met, the intelligence layer may generate a relevant alert. For example, the intelligence layer 350 may analyze the patterns of the data provided by the data processing layer 352 for any outliers that may indicate a problem at an RRM. In this regard, the intelligence layer 350 may trigger a notification to other RRM modules to prevent and/or mitigate the problem from spreading. The alert may simply be a notification (e.g., a suggestion to act) or an active control signal that alters the RRM method of one or more modules that are part of the system 300.

The intelligence layer 350 typically includes a probability tree that stores the probabilities that particular causes and/or events were the root cause of a network event such as a dropped call. The implementation of a probability tree is described in further detail with respect to FIG. 7. Note that that a node with an intelligence layer 350 need not have the same probability tree as other nodes. In this way, nodes may be partitioned according to scenario and/or use cases.

For example, the data processing layer 352 may receive information from first RRM module that is indicative of a problem. The data received from the first RRM module may, for example, indicate that the SGW is overloaded with signaling messages. The intelligence layer 350, upon identifying the problem with the first SGW, may retrieve contextual information from the measurements megastore related to the network element and other network elements. Upon determining that a condition is met or a predetermined threshold is exceeded, the intelligence layer 350 may issue a notification to other RRM modules configured to receive messages from the data framework 370. In one embodiment, the first RRM module also receives the alert from the data framework 370, generated by the intelligence layer 350. In this regard, the other eNodeB modules can buffer or discard the communication requests going to their systems, respectively, to prevent the problem that affected the first RRM module.

Accordingly, the contextual information in the measurements megastore 340 can be made available to an RRM module by the measurements megastore 340 in response to a request (e.g., query) from the RRM module, or may be provided as a notification from the data framework 370.

Figure 4:
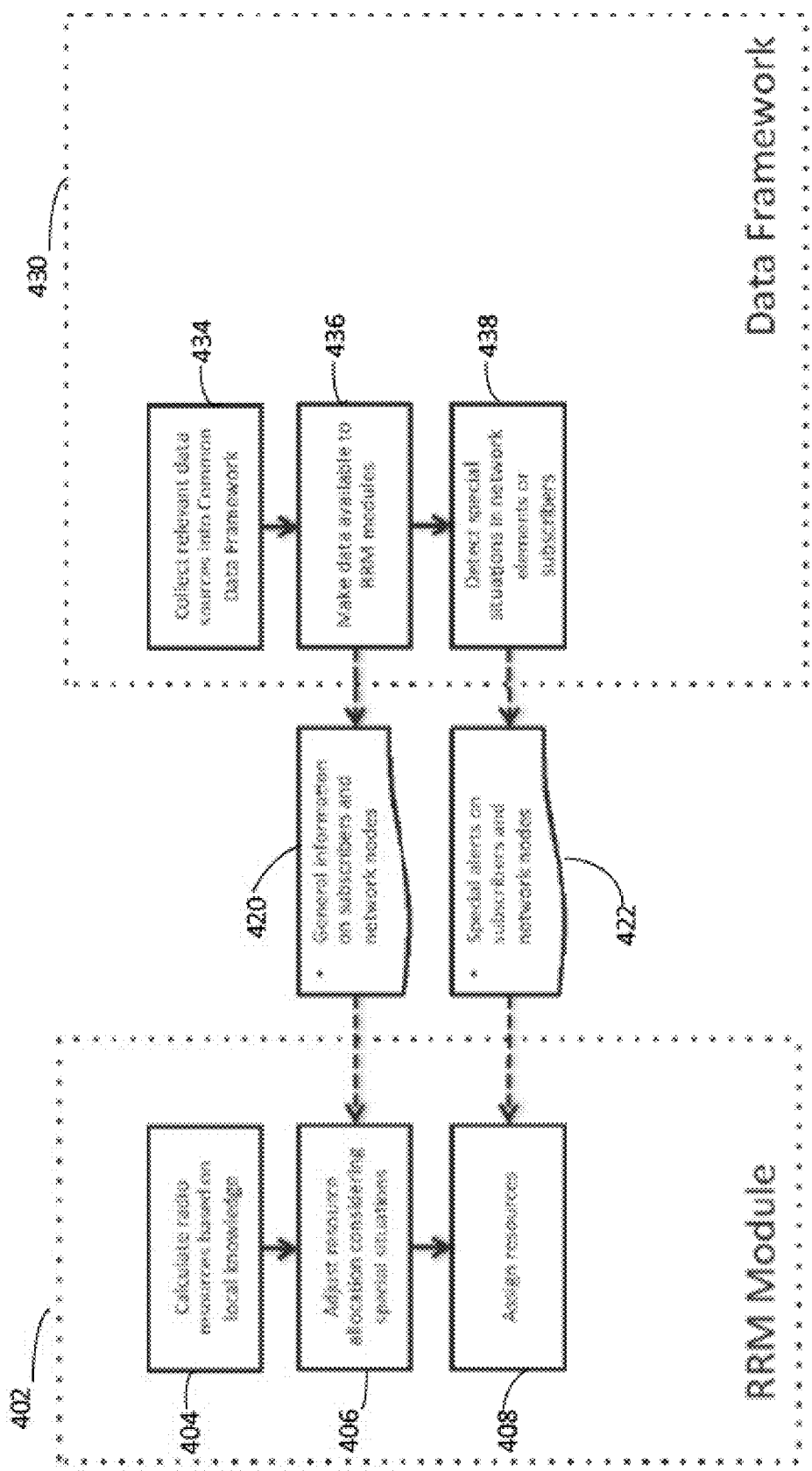
FIG. 4 is a flow diagram of an example process for a modified RRM utilizing Big Data Records.

With the foregoing overview of the system, it may be helpful now to consider a high-level discussion of an example operation of the system 300. To that end, FIG. 4 illustrates a high level flow chart of the data framework 430 and an RRM module 402 and their interaction with one another. The RRM module 402 may be one of several RRM modules that are configured to receive data from a data framework 430. The data framework 430 includes contextual information that is gathered from multiple sources, which is used by the RRM module 402 for adjusting the resources of the RRM module (e.g., optimize a connection between an eNodeB and an UE).

Beginning with the data framework 430, in step 434, relevant data is collected from various sources into a common data framework. This data is collected by a data processing layer in real-time and/or in batch. The data gathered may be from various sources, which may include different components of the wireless communication network 100, including separate RRM module's configured to operate on the wireless communication network 100. For example, each RRM module may provide the radio resources based on its local knowledge of the wireless communication network 100 and its corresponding UE(s) of the wireless communication network 100 of FIG. 1. The sources of the data gathered may also include other servers of wireless communication network 100 and the internet. The type of information received by the data framework 430 (via the processing layer) may include subscriber radio trace (e.g., location) provided by a UE, operations subsystem (OSS), customer care records, billing, application performance monitoring reports, and other information, including relevant information from the internet. In one embodiment, the data harvested by the data processing layer ultimately becomes the contextual data that is stored at the measurements megastore server 340, which may be used retrieved by other network elements or the data processing layer.

In one embodiment, in step 436, the data gathered from the various sources by the data framework 430 is provided to the RRM module 402 to adjust its resources allocated to a connection between its eNodeB and a corresponding UE. The information may include data that has not been processed by the intelligence layer, such as general information on subscribers and network nodes.

In one embodiment, in step 438, the data gathered by the data framework is further processed by an intelligence layer, which is operative to analyze the data and extract patterns and/or trends therefrom. For example, in step 438, the intelligence layer may determine whether one or more thresholds are exceeded or one or more criteria are met. For example, the RRM module is OFF or the number of dropped calls exceeds 0.1%. In various embodiments, the considerations by the intelligence layer may include user/subscriber predetermined preferences, subscriber limitations (e.g., exceeding a threshold data usage), the type of plan (e.g., higher grade plans may be given priority), type of UE (e.g., devices that are intended to work under low power conditions are provided connections that demand less power), etc. In this regard, in step 422, the data framework 430 may provide one or more messages to the appropriate RRM module(s) in a form of special alerts, which may include instructions on how to adjust the local resources for a connection between the eNodeB and its corresponding UE, on an individual basis. For example, the appropriate RRM module(s) where the alert from the data framework 430 to the RRM module(s) are sent may be based on sector and/or time (e.g., the RRMs covering a sports stadium at the time of a game).

On the RRM module 402 side, in step 404, the RRM module 402 calculates the radio resources based on local knowledge. The local knowledge may include the type of device (UE) it is establishing a connection with, the number of UE's the local eNodeB is connected with, traffic, power consumption, modulation quality, temperature of the eNodeB, etc. In one embodiment (not shown) this information is provided to the data framework 430 via the data processing layer 352.

In step 406, the RRM module 402 adjusts the resource allocation between its eNodeB and each UE on an individual basis, based on the general information data received from the data framework 430 in step 420. As discussed above, in one embodiment, the RRM module 402 may receive one or more messages from the data framework 430 in the form of one or more special alerts (i.e., notifications). In step 408, the RRM module 402 assigns the resources of eNodeB based on the special alerts on subscribers and network nodes received from the data framework. While steps 406 and 408 have been illustrated by way of example to be separate steps, in one embodiment, the adjustment of resources and the assignment of resources may be performed by the same step (e.g., 408).

For example, based on the information received from the data framework 430 having the measurements megastore 140, the eNodeB of the RRM module 402 may adjust the connection based on the power (e.g., consumption limitation) requirements for each UE individually. In various instances, based on the contextual information received from the measurements megastore 140, an eNodeB may gradually reduce the number of UE's that are allowed to connect to a respective eNodeB in order to balance the radio access network 122 resources and/or prevent failure. For example, the scheduler 322, upon receiving a warning from the measurements megastore 340, may stop sending new session requests to the radio access network 122.

Other remedial actions may include reducing the bandwidth or preventing communication with specific UE's that have exceeded predetermined thresholds or have not met one or more criteria. In various embodiments, the restriction(s) may be lifted after a threshold time or upon receiving a message from the measurements megastore 140 that the UE is within predetermined thresholds. In one example, the restrictions may be lifted when a criterion is met (e.g., sporting event at an arena, which is serviced by eNodeB 319, has completed), which reduces the risk of overloading the eNodeB of the RRM module 402.

Figure 5:
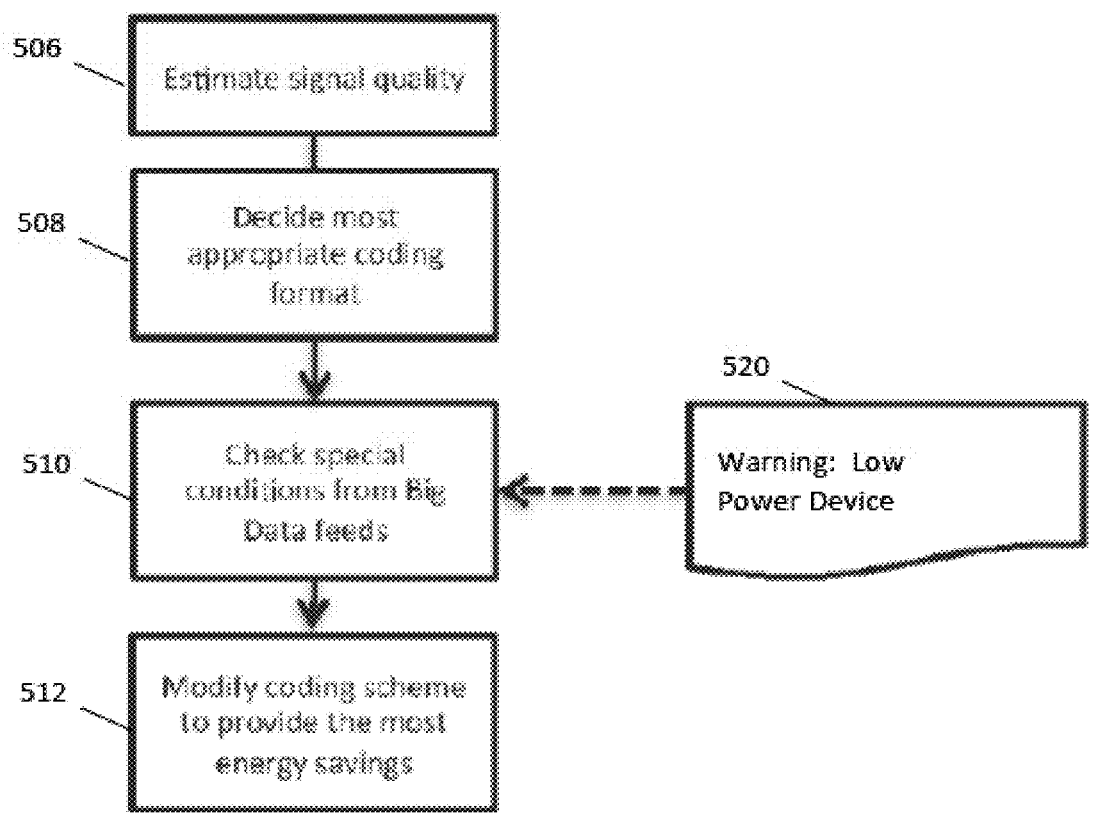
FIG. 5 is a flow diagram of an example process for adjusting a connection between an eNodeB and an EU based on a notification from the measurements megastore.

FIG. 5 is a flow diagram of an example process for adjusting a connection between an eNodeB and an EU based on a notification from the measurements megastore 140. The flow diagram of FIG. 5 is a particular example that considers the type of the network element and the stored criteria for such a type of element. In step 506, the RRM module determines the radio signal quality between an UE the eNodeB based on local knowledge. In one embodiment, in step 508, the RRM module determines the appropriate coding format based on the determined radio signal quality based on local knowledge.

In step 510, the RRM module communicates with the measurements megastore 140 to receive contextual information therefrom. This step may be performed as a query from the RRM module to the measurements megastore 140, or a push notification from the measurements megastore 140 to the RRM module based on predetermined criteria stored at the measurements megastore 140.

In the example of FIG. 5, the RRM module may perform a query (e.g., over the internet 120) to the measurements megastore 140 in support of various network operations. In the present example, the network operation is to initiate and establish a communications for a UE. In various embodiments, the RRM may send the UE device identifier and/or other indicators of radio signal quality based on local knowledge to the measurements megastore 140. In response, in step 520, the measurements megastore 140 may indicate that the type of UE that the RRM module is in the process of establishing a connection with, is intended to work at low power, and the connection between the eNodeB and the UE should be optimized for low power operation. For example, the connection may be serving an M2M customer that may benefit from a connection that uses the least amount of power. This scenario may be of importance for medical devices that are implanted or are wearable personal health monitoring devices. Thus, in step 520, the contextual information provided by the measurements megastore 140 may be in the form of a notification (e.g., warning) or an instruction to the RRM module to adjust the connection such that the UE consumes a more optimized (e.g., least) amount of power.

In another scenario, the indicators of radio quality that were determined based on local knowledge, that were provided to the measurements megastore 140, may include the battery status (e.g., running low). In this regard, the measurements megastore 140 in cooperation with the intelligence layer may identify from previously stored user preferences that the UE (that is now running low on power) should be operated in low power mode to extend its duration as long as possible. In this regard, the intelligence layer may issue a notification (in step 520) to the RRM module that the connection between the eNodeB and the UE should be of low power. Thus, without the additional input from the measurements megastore 140, the RRM module would not have determined that the user preferences include a low power operation when a predetermined condition is met (i.e., running at low power).

Accordingly, in step 512, the RRM modifies the coding scheme to provide a connection with the UE that provides the most power savings, which may include a lower bandwidth operation, thereby freeing up radio access network 122 resources for other purposes. For example, the warning received from the intelligence layer triggers an "event handler" at the eNodeB to perform some the power saving functions.

Intelligent Automatic Troubleshooting for Radio Access Networks

As discussed above, in one aspect, by using a measurements megastore 140, automatic detection of network problems at a subscriber level are made possible. In some scenarios, a problem can be identified (and sometimes prevented) even before the customer becomes aware of the problem, which greatly improves customer relations. This advantage may be better understood in view of existing approaches to address network problems and related customer complaints. For example, when a subscriber (e.g., customer) experiences a network problem, there is typically a lengthy and sometimes frustrating process involved, which is typically highly manual, requiring the frequent intervention of skilled engineers to identify and resolve the issues.

For example, a customer first must call and explain the symptoms to a customer care representative, who classifies the matter based on predetermined criteria. An internal record may be generated to be analyzed by an appropriately skilled engineer. An engineer may create a Call Reliability Report that includes the traffic volume, number of dropped calls, reasons for the dropped calls, and an overall calculated drop call rate for the node(s) of concern. In some cases, there is an intermediate engineering triaging group that may address some of the complaints, while in other cases, the case is sent to a field engineer to investigate the root of the problem. Due to the complexity of the radio access network, the field engineer may investigate multiple systems to determine what the cause of the problem may be based on the limited analysis that s/he could perform from the local knowledge of the network.

The challenges of the engineer are further exacerbated by the fact that in today's cellular networks, there are an increasing number of data sources with a substantial amount of performance data that is collected from each network element (e.g., eNodeB), which is often aggregated in time intervals such as minutes, hours, days, etc. Together the data provides key performance indicators (KPIs), which are reviewed by engineers to better understand the overall health of the radio access network, detect problematic situations, and decide when it is time to upgrade part of the network. Furthermore, in existing systems it is difficult to aggregate data from disparate sources, particularly if they are of different nature. For example, a report including a drop call rate trend in one area is not easy to combine with the churn rate trend. Such specialized report requires significant processing and therefore may not be immediately available to the engineer. Once the data is made available, the engineer must still manually analyze the large volume of data, which is not only inefficient but may also be incomplete because an engineer may not be able to effectively discern trends from multiple data sources. The result is typically a sub-optimal radio access network performance.

In contrast, in the system described herein, the bulk (if not all) of the analysis of the state of the network automatically performed by a data framework that includes a measurements megastore 140. Indeed, the root cause of the problem may be determined (if not prevented) even before the customer becomes aware of the problem. Such automation is made possible by a measurements megastore 140 that, together with a data processing layer and an intelligence layer, is configured to detect problems at a subscriber level by not only relying on local knowledge of the network element, but also using data related to the entire network and by automatically curing the problem and/or providing a notification (e.g., reporting it) to the appropriate representative and/or field engineer.

In one embodiment, to accommodate the real-time and large volume of information that is being generated by many (e.g., millions) of subscribers, the measurements megastore 140 uses a massive parallel processing technology such as Hadoop, Storm, or Spark. In addition, machine learning components are used to identify patterns and trends based on pre-determined training sets. In one embodiment, previously unknown problems are detected by different clustering models. For example, data is grouped in such a way wherein objects in the same group (i.e., cluster) are more similar to each other than to those in other groups (i.e., clusters).

Figure 6:
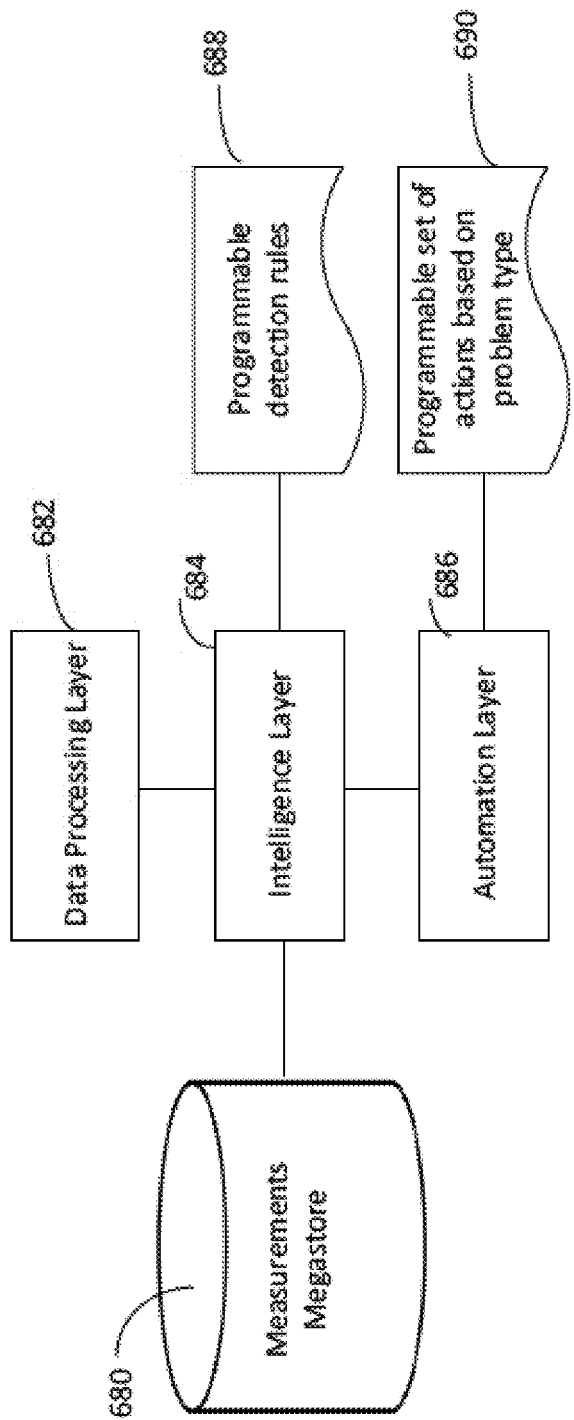
FIG. 6 is a block diagram of a data framework, consistent with an exemplary embodiment.

FIG. 6 is a block diagram a data framework, consistent with an exemplary embodiment. The data framework of FIG. 6 is similar to that of FIG. 3 discussed above, but has been redrawn for clarity to facilitate the discussion of automatic troubleshooting of radio access networks. The data framework of FIG. 6 includes a data processing layer 682, an intelligence layer 684 that may include programmable pattern detection rules 688, an automation layer 686 that is configured to store programmable set of actions based on the problem type 690, and a measurements megastore 680.

The type of information received by the data processing layer 682 may include, among other elements: data from a customer care trouble ticket database; network element counters and KPIs; network element (UE) location; alarm and fault information; subscriber information, including subscriber plans, utilization (e.g., minutes/data), billing address, etc.; handset information, including handset type, OS, apps, battery status, etc.; subscriber detailed information records, including Geolocation, radio, core network and IP level traces; Wi-Fi records and metrics, etc. The data processing layer 682 may be performed in real time and/or in batch. The monitoring may be performed continuously, 24 hours a day, 7 days a week, at predetermined intervals, or in response to a trigger from the intelligence layer 384 of the monitoring system. Thus, the data processing layer 682 monitors detailed subscriber traces, and records fault situations, such as a dropped call, an access failure, or a problem with Internet connectivity. This data is stored in the measurements megastore 680 together with data from other network elements as contextual information that may be used by various network elements.

The intelligence layer 684 is configured to receive the information from the data processing layer 682 and pattern detection rules 688 that may be preprogrammed in the intelligence layer 684. In one embodiment, the intelligence layer 684 may include different intelligence models for different types of failures. The intelligence layer 684 is configured to identify a probable cause of a problem as well as an estimation of accuracy (error) for the error detection. In one embodiment, the accuracy of the detection is based on the frequency of the occurrence of the error.

For example, the estimation of accuracy may be high when a customer may be experiencing degraded performance (drops, access failures, etc.) in an area that has been identified by the intelligence layer to be undergoing maintenance or where there is a known lack of coverage. The intelligence layer may further improve the accuracy by reviewing the customer trace, network health indicators, and the UE reports, etc. From the disparate sources of data, the intelligence layer 684 can identify whether the drop is due to (1) coverage, (2) interference, (3) hardware failure, (4) software failure, etc.

The automation layer 686 may trigger an automatic response to an identified network error without having to rely on prior human processing of the raw data harvested by the data processing layer 682. In one embodiment, the appropriate action for an identified problem is preprogrammed by a system administrator at the intelligence layer or at the network element node. The action may be a resetting of a node or sending a note to the field engineer with the identified problem and potential solution. In other cases, the automated action may be to send a message to the subscriber, notifying them of the cause of the problem (e.g., there is ongoing maintenance work in the area), or providing an automatic credit to compensate for the degraded performance and notifying the subscriber of the same.

In one example, where multiple subscribers suffer a substantially similar problem in one area, the automation layer 686 may automatically send a message to all subscribers in that area to prophylactically cure the problem before the subscribers are affected by the problem. Put differently upon determining that a group of other network elements in an area of the first network element meet a predetermined condition or exceed a predetermined threshold, a notification is automatically sent to all network elements in that group. In one embodiment, network errors that are identified with an accuracy below a first threshold are treated differently from those with an accuracy of above a second threshold. In one embodiment, the first and second threshold have the same value. For example, if an error has been detected that is deemed to be of low accuracy, an automatic action may not be performed until additional data is received to improve the accuracy and/or the subscriber calls about the problem. However, if the error is identified with a high accuracy, automatic immediate remedial measures are undertaken.

For example, the automation layer 686 in cooperation with the intelligence layer 684 may propose a palliating action upon determining that a particular subscriber is not receiving the expected quality of service. In case of a coverage problem, the intelligence layer may determine whether there is an option to use Wi-Fi calling. In this regard, the automation layer 686 may send a notification to the subscriber and care representative to facilitate the activation of Wi-Fi calling.

Figure 7:
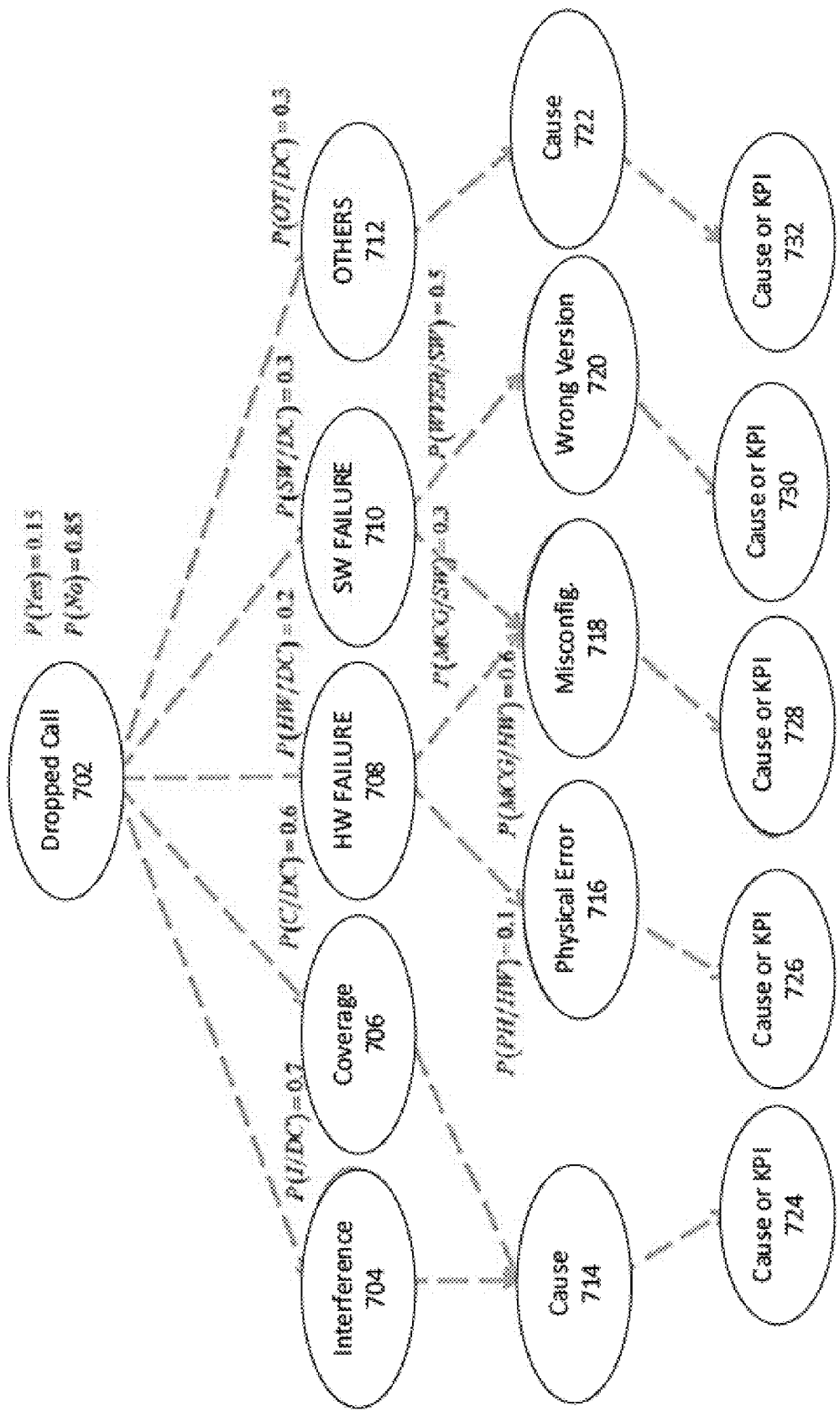
FIG. 7 illustrates an example model for a root cause identification.

FIG. 7 illustrates an example model for an automatic root cause identification. Specifically, FIG. 7 illustrates a probability tree that stores information as to the probable root cause for a dropped call. Based on a large corpus of data, a machine learning algorithm can determine the probabilities that an event, such as a dropped call, was correlated to a particular cause. In turn, a particular cause, may have different potential causes of its own, each with their own probabilities. Eventually, the probability of a root cause, may be discerned.

In FIG. 7, we start at the top of the probability tree with a dropped call event 702. Every event is associated with a probability P(Event). For example the probability that a detected network event could be a dropped call is illustrated as P(Yes)=0.15 (or 15%). The probability that the detected network event is some other event is P(No)=0.85.

The probability tree may then be traversed to determine the most likely root causes. To do so, the probability tree is traversed to the nodes representing potential immediate causes for the dropped call event 702. These may include radio interference 704, poor coverage 706, hardware failure 708, software failure 710, or other failures 712. As with the dropped call event, each cause is associated with a probability. Because, these causes are potential causes, the probabilities are expressed as conditional probabilities P(Condition|Event). For example, the probability that a dropped call was caused by a hardware failure 708 is shown as P(HW|DC)=0.2. Similarly, the probability that a dropped call was caused by a software failure 710 is shown as P(SW|DC)=0.3.

Cause nodes may in turn have their own respective causes. For example, radio interference 704 and poor coverage 706 may have the same cause 714. Hardware failure 708 may have different possible causes, here shown as a physical error 716 and misconfiguration of user equipment 718. Again, the each node is associated with a respective probability, and as potential causes, each probability is expressed as a conditional probability. Here the probability that a physical error in the hardware 716 caused a hardware failure is shown as P(PH|HW)=0.1. The probability that the hardware was misconfigured 718 caused the hardware failure is shown as P(MCG|HW)=0.6.

Note that a software failure 710 may also be caused by misconfiguration 718. Even though the probability tree traverses to a node also traversable from hardware failure 708, the misconfiguration node 718 has its own probability as the cause of a software failure 710 as shown as P(MCG|SW)=0.3. A software failure 710 may also be caused by having a wrong version of software installed 720, with a causal conditional probability of P(WVER|SW)=0.5.

Similarly, other causes 712, may have their own respective causes 722.

A probability tree is generally populated via receiving a statistically significant corpus of data. The data is then applied to the probability tree to compute the probabilities in the probability tree.

When performing a diagnosis, the probability tree starts with the causes and/or KPI leaf nodes 724, 726, 728, 730, 732. Depending on the network data observed, the probabilities of the causes and/or KPI leaf nodes 724, 726, 728, 730, 732 are updated. For example, if a misconfiguration is actually observed, the probability of the misconfiguration 728 is changed to 100%. If a cause 724 is not observed, that probability is changed to 0%. Probabilities need not be binary, i.e. solely 100% or 0%. Intermediate (non 0% non 100%) probabilities may be computed based on a sampling or running average of data.

Once the causes and/or KPI leaf nodes 724, 726, 728, 730, 732 are updated, the parent node probabilities are updated according to Bayes Algorithm. Thus the conditional probabilities of the parent nodes 714, 716, 718, 720 and 722 are updated using the child node as a determination as to whether a condition was satisfied. The probabilities of the parent nodes 714, 716, 718, 720 and 722 are then updated. This process is repeated for the level of parent nodes above, until the root node 702 is reached. At this point, all the probabilities in the probability tree have been updated in light of the observed causes and/or KPIs 724, 726, 728, 730, 732.

Potential root causes of the root node, the dropped call, 702 will be surfaced to a user by selecting all child nodes with updated probabilities exceeding a predetermined threshold.

After finishing analysis, the probability tree is returned to its original state and original probabilities.

However, over time the historical data may be collected and upon agreement by an administrator, at least a subset of the historical data may be applied to the probability tree to permanently update the probabilities in the probability tree. Subsequent analyses will then use the updated probability tree. In this way, the probability tree learns from historical data.

It is to be emphasized that this particular approach in machine learning is but one option. Other well-known options include entropy based trees and naïve-Bayesian trees. One advantage peculiar to a Bayesian based tree is that the domain of causes and/or KPIs may be partitioned into sub-domains without forcing re-computation of the probabilities. Accordingly, a probability tree may be partitioned for different subsets of the network as desired by the administrator.

Figure 8:
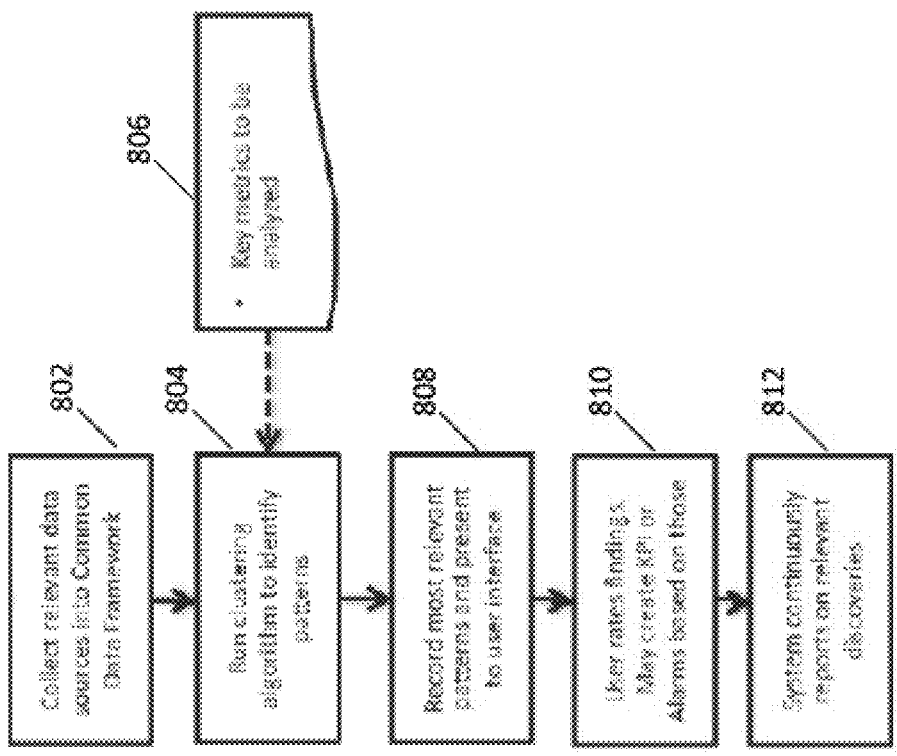
FIG. 8 is a flow diagram of an example process for maintaining a radio access network performance.

FIG. 8 is a flow diagram of an example process for assisting an engineer in maintaining a radio access network performance. In step 802, data is automatically collected from various sources into a common data framework that is stored in the measurements megastore. In step 804, a pattern recognition is performed on the data by one or more clustering algorithms. In one embodiment, in step 806, the key metrics to be analyzed are preprogrammed in the measurements megastore or are interactively provided to the measurements megastore via a user interface 900 (see FIG. 9) by an operator. The user interface 900 may be via a software application on a terminal or a handheld device that is communicatively coupled either directly or wirelessly to the measurements megastore 140 of FIG. 1. In various embodiments, the engineer can select (e.g., 904) the type of analysis to be performed and the level of detail to be reported, both at the network element (e.g., geographical/node level) and at the KPI level.

There are an unlimited number of patterns that the measurements megastore may detect. For example, an area with a high churn rate may show that most of the subscribers are concentrated in a small geographical area. A sector experiencing degraded performance may indicate a high number of resets in a specific time period. A large number of customers who call customer care may show the number of calls that are being routed directly to voice mail to be exceeding a predetermined threshold limit. An area indicating a drop call rate that is within a predetermined threshold, may indicate a number of instances in which customers had to re-dial within a predetermined time, to exceed a threshold limit (which may indicate a poor call quality). A sector may indicate congestion despite carrying traffic that is below a threshold limit. A threshold number of customers may experience their coverage shrink after a network upgrade. Of course, countless other scenarios are supported.

In step 808, relevant patterns, as they are learned, are persisted, for example in a memory of the measurements megastore 140. In one embodiment the measurements megastore 140 displays the analysis results, comprising the most relevant patterns, to the engineer on the user interface 900. In another embodiment, patterns that are associated with automated fixes, may trigger the execution of those automated fixes.

Figure 9:
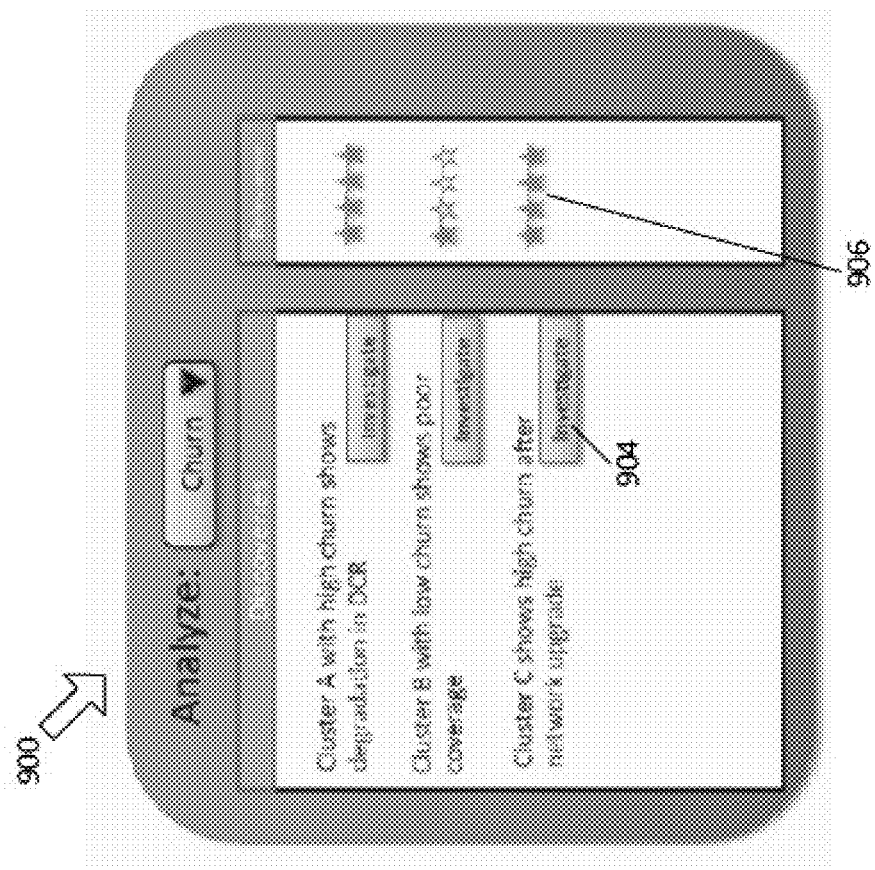
FIG. 9 is an example user interface of a terminal coupled to a measurements megastore.

In one embodiment, in step 810, the engineer may rate the analysis results of the measurements megastore. In this regard FIG. 9 illustrates by way of example an interface that may be used by an engineer to rate the relevance of the analysis (e.g., discovery) of the measurements megastore by a selection of 1 to 5 stars 906. In various embodiments, the selection may be performed after the engineer has confirmed and cured the network issue, or upon initial display on the user interface 900.

In one embodiment, in step 810, the engineer may request an automatic KPI and/or a notification to be issued based on the analysis. The KPI may be stored in the measurements megastore and used as a reference. The KPIs and notifications may can be used to predict events, such as when an area will likely increase its churn level.

In one embodiment, in step 812, the system described above can be trained, where it automatically repeats prior analysis based on prior similar circumstances and generates similar KPI's and/or alarms continuously, at predetermined intervals, or when a specific error is identified. In one example, intelligence layer of the system described herein may be combined with a self-organizing network (SON), to perform automatic planning, configuration, management, optimization, and healing of the radio access network.

Example Use Case in the Medical Field

As discussed above, in one aspect, the system described herein provides an open platform where multiple data feeds from disparate sources can be combined and processed in real time. Much of the preceding discussion has been towards application in network management. However, the techniques described herein provide a learning and feedback loop that may be applied to any field where there is a stream of event data, where the event data may be classified into categories that may be correlated with causes. Where a probability tree can be constructed, the preceding techniques may be applied.

One example alternative field where this capability is particularly useful is in the medical field, which increasingly uses health monitors, such as UE 102d, which may be worn by both the healthy and ill to monitor the medical well-being of the wearer. Today, one or more of such health monitors can be worn to provide a range of medical analysis of a user (sometimes referred to herein as a patient or subscriber) and provided to an appropriate caregiver to extract the relevant information from the one or more health monitors.

These health monitors can come in a variety of forms, such as implanted, worn on the wrist, worn around the neck as a necklace, strapped around the chest, etc., These monitors can monitor a variety of health functions, such as heart rate, heart rhythm, blood pressure, motion, oxygen saturation, temperature, glucose level, etc. Traditionally, each health monitor operates in isolation. For example, the health monitor that measures the heart rate is mutually exclusive from the health monitor that measures the glucose level or motion. The data points that are acquired are then provided either directly to the patient on a user display or stored in a memory of the health monitor, respectively, to be later read by one or more caregivers. In some cases, the acquired data is sent periodically, or upon trigger from the user, to disparate receivers at one or more caregivers. Each health monitor is typically applied in response to a health ailment suspected by the caregiver. Accordingly, in traditional systems, a continuous monitoring that provided a synthesis of the information from the health monitors to identify unsuspected health conditions is not available.

In contrast, the system described herein is capable of performing continuous monitoring and/or continuous transmission of the monitored data from each health monitor, which can be synthesized at a centralized remote health monitoring system 150. The synthesized information harvested from the disparate sources is configured to analyze the data for potential ailments and provide relevant notifications.

Figure 10:
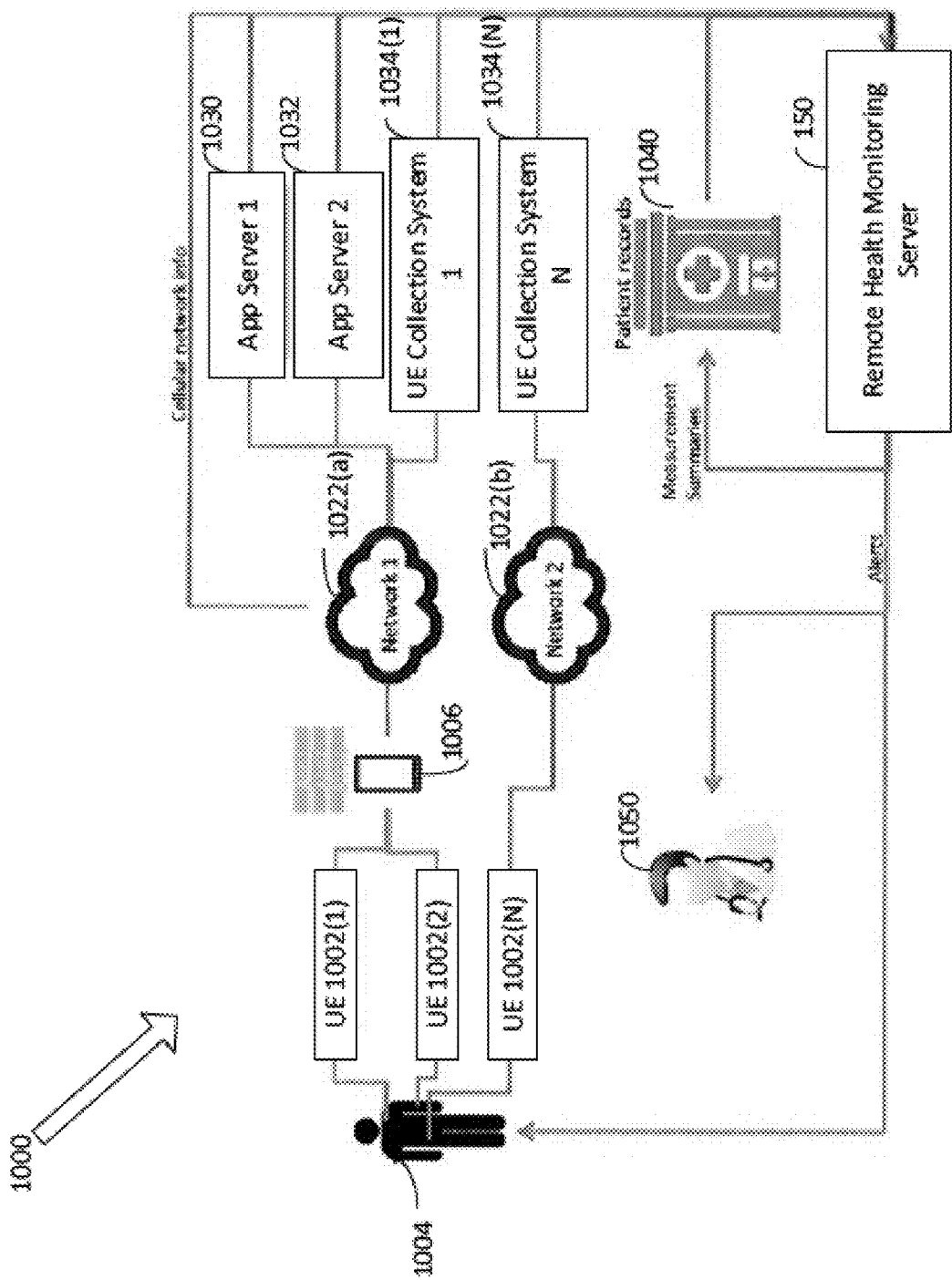
FIG. 10, which illustrates a high level diagram of a system that includes remote health monitoring, consistent with an exemplary embodiment.

Reference now is made to FIG. 10, which illustrates a high level diagram of a system that includes remote health monitoring, consistent with an exemplary embodiment. In system 1000 one or more health monitors, represented by UEs 1002(1) to 1002(N), are operative to monitor various aspects of the health of user 1004. The health monitors 1002(1) to 1002(N) can provide the health information to one or more disparate monitoring systems, represented in system 1000 by application servers 1, 2 (1030, 1032), and UE collection systems 1 to N (1034(1) to 1034(N)). For example, application servers 1, 2 (1030, 1032), and UE collection systems 1 to N (1034(1) to 1034(N)) may be regarded as third party systems that provide health related recordings of measurements from corresponding health monitors, which may be in the form of a Samsung® Gear® Watch or Apple® iWatch.

The health information may be provided by various networks. For example, some health monitors may communicate with their monitoring system over one radio access network 1022(a) while other health monitor may communicate over another radio access network 1022(b). In one embodiment, a health monitor may communicate with their respective (e.g., subscribed) monitoring system over a radio access network 1022(a) by using a device that is configured to communicate over the network 1022(a), such as a smart phone, tablet, etc. In one embodiment, the health monitors 1002(1) to 1002(N) provide the health information directly to the health monitoring server 150.

In one aspect, the example system 1000 is compliant with the Health Insurance Portability and Accountability Act (HIPPA) in that physical and technical safeguards are included to limit the access to the remote health monitoring server to only authorized individuals and account holders. In one example, unique user IDs, automatic log off procedures, encryption, and decryption are required to access the system 1000.

In one aspect, the remote health monitoring server 150 acts as a measurements megastore and provides an open platform where the multiple data feeds from the disparate servers 1030, 1032 and collection systems 1034(1) to 1034 (N) are combined. The health data is processed in real time, for many (e.g., millions) of individuals like user 1004 by a data processing layer, which may be part of the health monitoring server 150 or in communication therewith. In addition, the remote health monitoring server 150 may gather data, such as patient records from hospitals 1040 and care providers 1050. Such data may include medical history, prior treatments, recorded blood-work, etc. In addition, the remote health monitoring server may gather data from the radio access network (e.g., 1022(a), 1022(b)) to determine the location information of the user 1004, identify network issues that may prevent data transmission, and other variables affecting network connectivity and the customer endpoints. In various embodiments, the location of the user 1004 may be determined by various techniques, such as triangulation, multilateration, and/or the GPS coordinates that may be provided by the health monitor (e.g., 1002(1) to 1002(N)), or its corresponding UE (e.g., 1006).

The data from the disparate monitors is analyzed for patterns and trends. Upon determining that that one or more thresholds are exceeded or one or more criteria are met, the remote health monitoring server 150 may send a notification to the user 1004 via a notification to a user interface of the corresponding health monitor (e.g., UE 1002(1)) or corresponding UE network capable device 1006. In one embodiment, the health monitor server 150 may send a notification to a relevant care provider 1050 and/or hospital, based on the type of condition.

Figure 11:
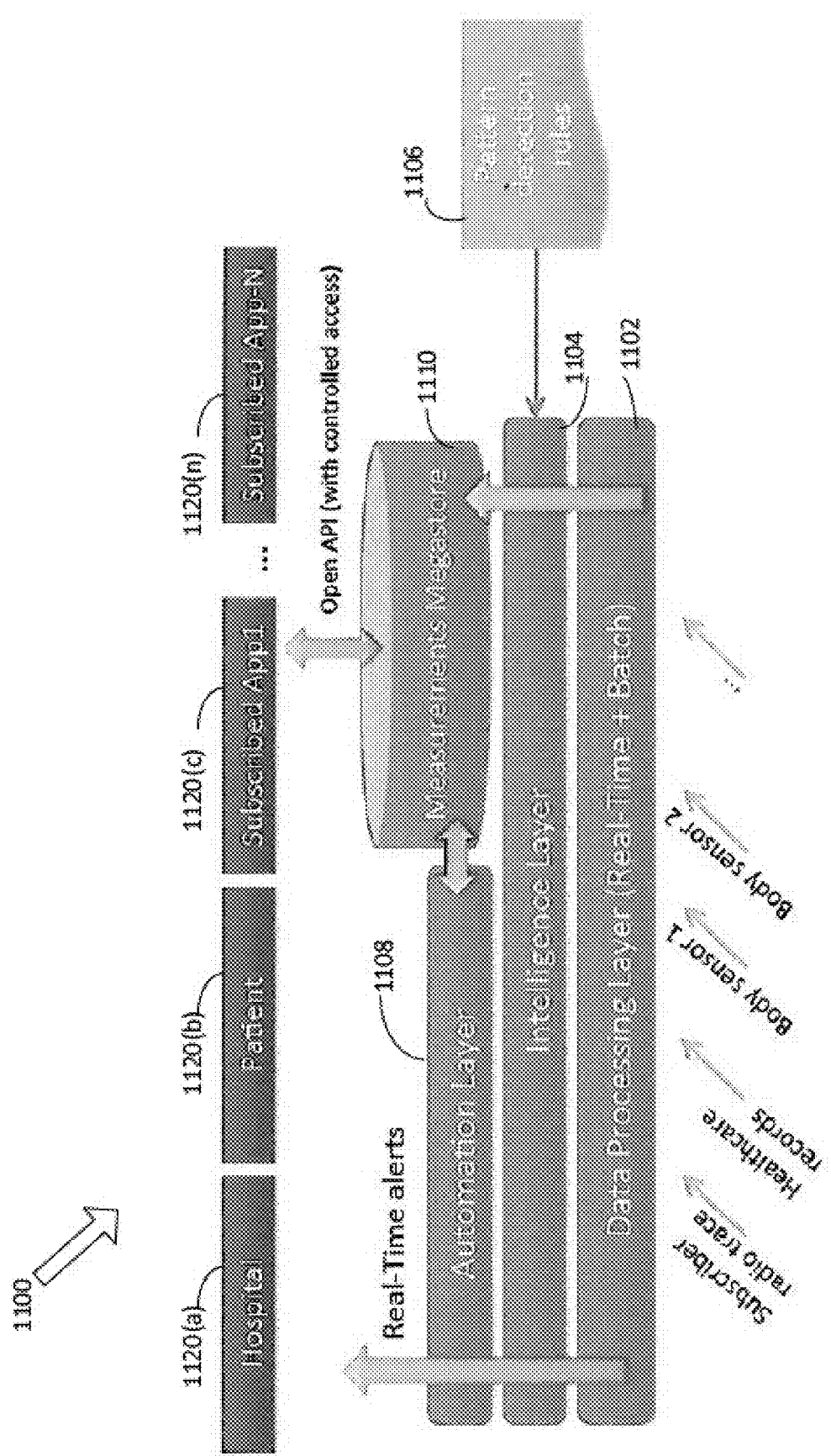
FIG. 11 is a block diagram of a data framework of a monitoring system, consistent with an exemplary embodiment.

FIG. 11 is a block diagram of a data framework of a monitoring system, consistent with an exemplary embodiment. The data framework in system 1100 uses massive parallel processing methods to gather health data from one or more health monitors (UE's) in real time. To facilitate the discussion, the automation layer 1108, the intelligence layer 1104, and the data processing layer 1102 is illustrated as being separate from the measurements megastore 1110, while it will be understood, that in various embodiments, these the functions may be combined on a single platform (i.e., a single measurements megastore that performs the features of the data processing layer, intelligence layer, and automation layer.)

The data framework includes a data processing layer 1102, an intelligence layer 1104, which may include pattern detection rules 1106, an automation layer 1108 and a measurements megastore 1110. The type of information received by the data processing layer 1102 may include subscriber radio trace (e.g., location) provided by a UE and/or the radio access network, healthcare records from one or more sources, customer care records, billing, application performance monitoring reports, and other information, including relevant information from the WEB. The data processing layer 1102 may be performed in real time and/or in batch. The monitoring may be performed continuously, 24 hours a day, 7 days a week, at predetermined intervals, or in response to a trigger from the intelligence layer 1104 of the monitoring system.

The intelligence layer 1104 is configured to receive the information from the data processing layer 1102 and pattern detection rules 1106 that may be preprogrammed in the intelligence layer. In one embodiment, the detections may be originally programmed by expert professionals, based on prior knowledge. A self-learning feature of the intelligence layer is operative to detect abnormal conditions without previous knowledge of that particular problem. Specifically, causes and/or KPIs may be detected as present when undesirable events, such as dropped calls occur. As described with respect to FIG. 7, a probability tree may be populated and/or updated to store the probabilities that those causes and/or KPIs are correlated with the undesirable event. In one embodiment, the pattern detection rules 1106 are different depending on the type of patient (e.g., leukemia vs. diabetes). For example, the health monitoring system, upon identifying patterns that are consistent with a medical condition, may update its rule set to focus on that condition by performing more analysis of the health data related to that medical condition. Thus, the pattern detection rules 1106 may be different from one subscribed user to the next.

To detect a specific condition, multiple data sources that were processed at the data processing layer 1102 may be analyzed and cross-correlated to determine whether one or more conditions are met. Specifically, first detected causes and/or KPIs are checked against a probability tree (see the discussion with respect to FIG. 7) whether they could possibly be a root cause for detected undesirable network events, such as dropped calls. Then the probability tree is traversed starting with the detected causes and/or KPIs. Since the probability tree stores probabilities, that the detected causes and/or KPIs caused an event, the probability tree can be traversed according to the most probable paths. In this way, conditions for undesirable network conditions may be evaluated as to the likelihood that particular causes and/or KPIs (and other events/causes along the path in the probability tree) in fact caused those undesirable network conditions.

Thus, the intelligence layer 1104 constantly sifts through the data to identify patterns within the disparate data sources. When a predetermined condition is met, the intelligence layer may generate a relevant alert to at least one of the user 1004 associated with one or more subscribed applications 1120(*c*)-1120(*n*), the care provider 1050 associated with the hospital 1120(*a*), a contact person previously stored in the database of the measurements megastore 1110, and/or an emergency service. For example, the intelligence layer 1104 may analyze the patterns of the data for individual types of measurements (blood pressure), or cross-correlate with different types of measurements or data (e.g., glucose level, weight, age, white blood cells, etc.,) provided by the data processing layer 352 and family history from the measurements megastore 1110, to identify any outliers (e.g., meeting a predetermined condition or exceeding a predetermined threshold) that may indicate a health concern with the patient 1120(*b*).

Accordingly, the automation layer 1108 may trigger an automatic response to the identified condition of the patient 1120(*b*) without having to rely on prior human processing of the raw data harvested by the data processing layer. Put differently, the intelligence layer coupled with the automation layer 1108 can detect health problems at a subscriber (i.e., patient) level and provide a notification without the subscriber or the health care provider having even suspected a health problem with the subscriber. An authorized care giver, medical practitioner, family and friends, or emergency response may be automatically contacted based on the preferences stored in a user profile stored in the measurements megastore 1110. For example, the medical practitioner associated with the hospital 1120(*a*) may provide immediate medical advice. The appropriate entity may be contacted automatically via the application server automation layer 1108 of the measurements megastore 1110. The appropriate entity may be contacted through the radio access network 122, through a public switched telephone network (PSTN) (not shown), or through an interne connection (120 in FIG. 1). In one example, different information is sent depending on the receiving entity. For example, when family/friends are contacted, the location information and the type of emergency may be sent. In contrast, when a medical practitioner is contacted, the location information, type of emergency, vital signs, medical history, etc., are sent. Thus, while different entities may be contacted for help, only specifically authorized entities receive the location information. In one example, the location information is used to send a prescription information to the closest pharmacy to the health monitor (e.g., 102*d* in FIG. 1).

Figure 12:
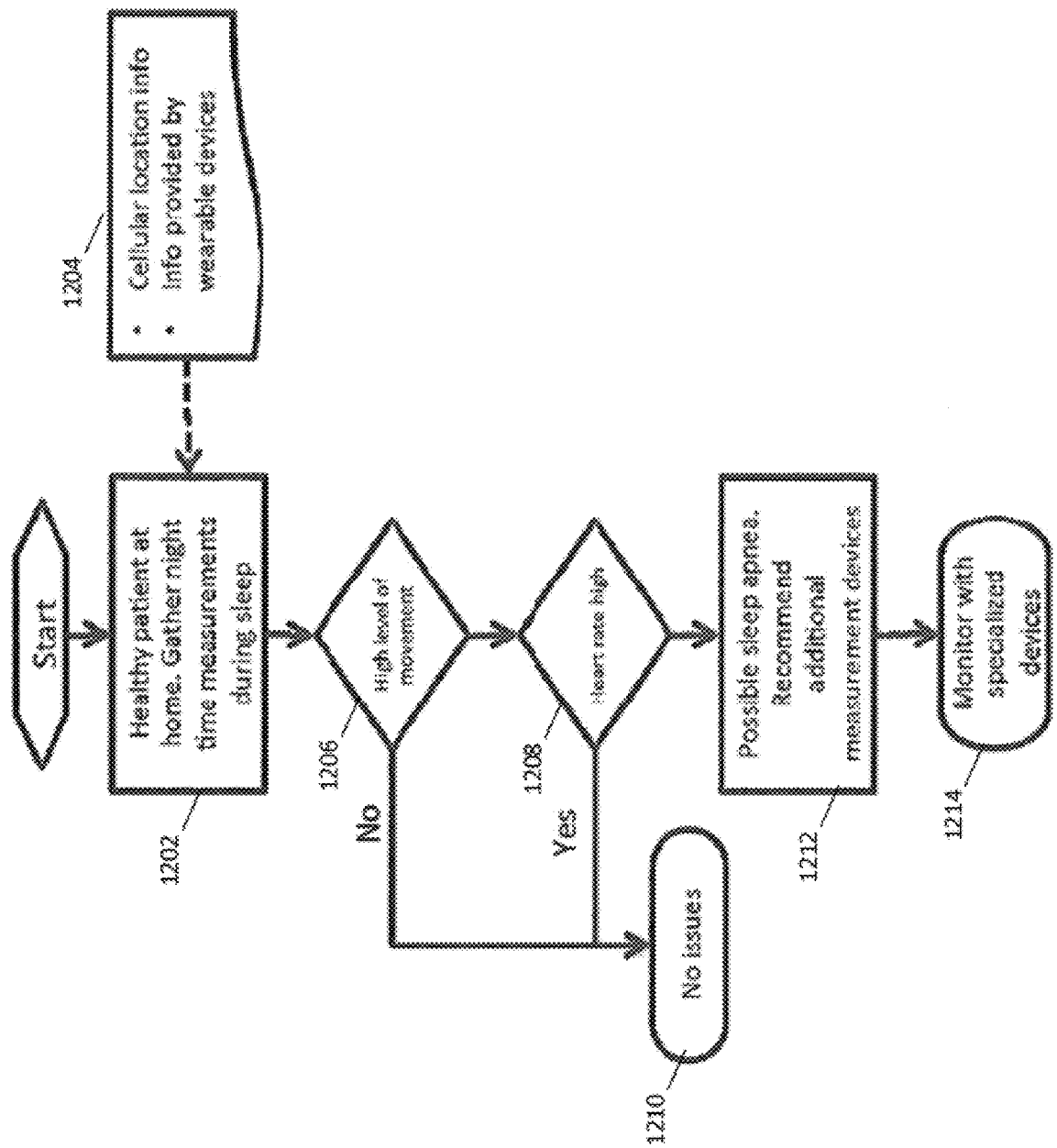
FIG. 12 is a flow diagram of an example process for identifying a health condition using Big Data Records.

FIG. 12 is a flow diagram of an example process for identifying a health condition using contextual information received from a measurements megastore. Consider a subscriber (who believes to be healthy) to be wearing one or more health monitors. For example, the health monitors may be an electronic fitness bracelet, an electronic necklace that can measure temperature/humidity, and a smart phone that is placed on the bed where the subscriber is resting. Further, at step 1202 the subscriber indicates on an app of the smartphone that the phone is placed on his bed, thereby allowing it to monitor his or her sleeping pattern. Thus, the app may gather night time measurements during sleep.

In step 1204 the measurements megastore may receive continuous information from all three sensors. For example, the smart phone may provide the location information from its global positioning system (GPS) and movement information from its accelerometer; the electronic fitness bracelet may provide the heart rate and movement information from its accelerometer; and the electronic necklace may provide a measurement of the temperature of the subscriber. In various embodiments, the health information may be received by the measurements megastore over different radio access networks and collection systems, as discussed in the context of FIG. 6 above. In particular, the health information may be received by the data processing layer of the data framework that includes a measurements megastore.

In step 1206, the intelligence layer of the measurements megastore analyzes the health information to determine whether there is a high level of movement. For example, it may correlate the movement information from the fitness bracelet with the information from the smartphone. If both sources indicate that there is no high level of movement, the intelligence layer concludes that there are no health issues in connection with sleep apnea (i.e., step 1210). However, if one of the sources indicates a high level of movement which is not confirmed by the second source, the intelligence layer may consult the WEB to determine whether the smartphone or the fitness bracelet has a more accurate accelerometer, and base its analysis regarding movement on the more accurate fitness monitor for this measurement.

If the intelligence layer of the measurements megastore identifies a high level of movement, it then determines whether there is a high heart rate. To that end, in step 1208, the intelligence layer analyzes the health information obtained from the fitness bracelet. In one embodiment, the intelligence layer may consult the WEB (or a lookup table) and/or other previously stored data to determine what is considered a high heart rate for this subscriber. For example, the stored information may indicate the weight, height, and age of the subscriber and previous medical conditions that may affect the heart rate (e.g., pace-maker). If the heart rate is not considered high for this subscriber, the intelligence layer concludes that there are no health issues in connection with sleep apnea (i.e., step 1210).

If the heart rate is determined to be high, in step 1212, the intelligence layer interacts with the automation layer to provide a notification to one or more recipients (e.g., the smartphone, the fitness bracelet, authorized care giver, medical practitioner, family and friends, and/or emergency response), depending on the severity of the condition or predetermined personal preferences of the subscriber. For example, the subscriber may receive a notification on their smart phone indicating that they may be suffering from sleep apnea. The automation layer may also recommend one or more additional health monitors to better analyze the medical condition, which may be used in subsequent measurements (i.e., step 1214).

Example Computer Platform

As shown by the above discussion, functions for storing contextual information, monitoring network elements, remote monitoring of subscribers' health, identifying a network status based on local knowledge, providing a connection between network elements, and other functions, can be implemented on computers connected for data communication via the network elements of the radio access network 122, operating as the monitoring server 130, measurements megastore 140, eNode B 119, and components of the radio access network 122, as shown in FIGS. 1 and 2. Although special purpose devices may be used, such devices also may be implemented using one or more hardware platforms intended to represent a general class of data processing device commonly used to run "server" programming so as to implement the receiving data from disparate sources from, retrieving contextual information, analyzing information for determining whether a predetermined condition is met or a predetermined threshold is exceeded, and providing notifications, as discussed above, albeit with an appropriate network connection for data communication.

Figure 13:
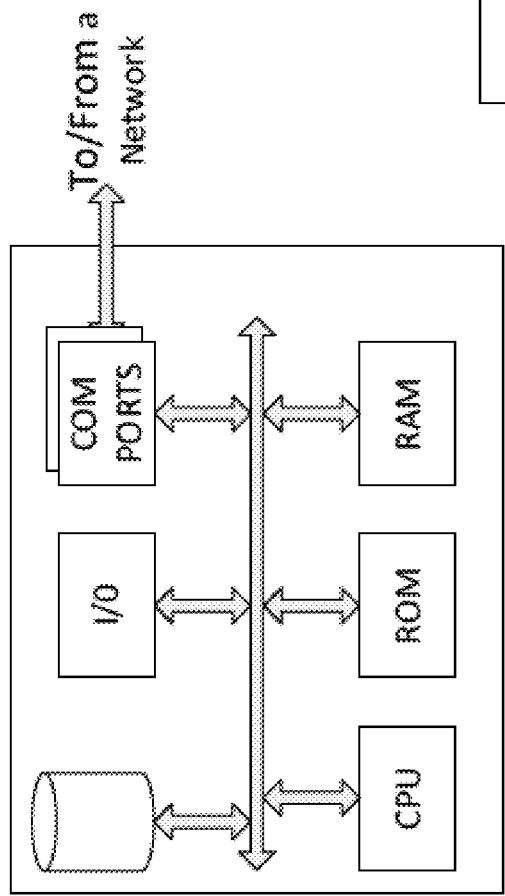
FIG. 13 illustrates a network or host computer.
Figure 14:
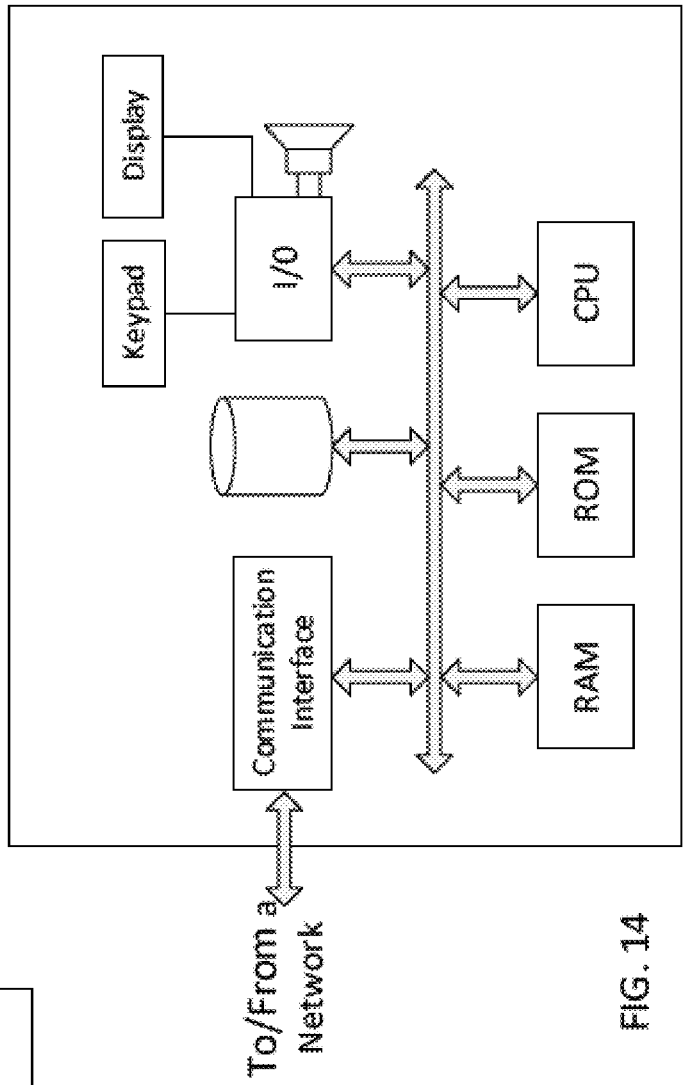
FIG. 14 illustrates a computer with user interface elements.

FIGS. 13 and 14 provide functional block diagram illustrations of general purpose computer hardware platforms. FIG. 13 illustrates a network or host computer platform, as may typically be used to implement a server. FIG. 14 depicts a device with user interface elements, as may be used to implement a personal computer, such as computer 102c of FIG. 1 or a workstation, or to implement a computing device, such as a portable handset, a smart-phone, tablet computer, a personal digital assistant or other type of mobile station or mobile terminal device (e.g., devices 102a to 102d of FIG. 1), although the device of FIG. 14 may also act as a server if appropriately programmed. It is believed that the general structure and general operation of such equipment as shown in FIGS. 13 and 14 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. As used herein, the computer system of FIG. 14 uses a massive parallel processing technology such as Hadoop, Storm, or Spark. Of course, the server functions may be implemented in a distributed fashion on a number of similar platforms, to distribute the processing load. In various other embodiments, the functionality of the monitoring server 130, measurements megastore 140, and the remote health monitoring system, may be combined in one or more server platforms.

The software functionalities involve programming, including executable code as well as associated stored data, e.g., files used for applications on the computing device to receive data from disparate sources by the processing layer, retrieving contextual information from the measurements megastore, analyzing the data from disparate sources and the contextual information, and providing notifications. The software code is executable by the computing device. In operation, the code is stored within the computing device. At other times, however, the software may be stored at other locations and/or transported for loading into the appropriate computing device system. Execution of such code by a processor of the computing device enables the computing device to perform functions of retrieving information, analyzing the information, providing notifications, etc., in essentially the manner performed in the implementations discussed and illustrated herein.

Hence, aspects of the methods of receiving and processing SUs as outlined above may be embodied in programming. Program aspects of the technology may be thought of as "products" or "articles of manufacture" typically in the form of executable code and/or associated data that is carried on or embodied in a type of non-transitory machine readable medium.

Conclusion

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer system comprising: a processor;
a network interface coupled to the processor and configured to enable communications via a communication network comprising a plurality of network elements, each network element being a user equipment, a base station, a gateway, a server, a management entity, or a network function;
a storage device; and
a program stored in the storage device having a data processing layer and an intelligence layer, wherein execution of the program by the processor configures the computer system to perform acts comprising:
receiving data from disparate sources related to a first network element of the plurality of network elements, the data from the disparate sources including:
data from at least one source other than the first network element, and
data based on local knowledge of the communication network of at least one source;
retrieving, from a measurements megastore, contextual information related to the first network element and at least one other network element, comprising at least:
application level information extracted via Deep Packet Inspection (DPI), a category of the first network element and the at least one other network element selected from: smart-phone, tablet, laptop or personal health monitoring device, and
capabilities of the first network element and the at least one other network element, comprising a maximum transmission bitrate and a battery status;
analyzing the data from the disparate sources and the contextual information by the intelligence layer for finding patterns, trends or both, incorporating a root cause identification stage by using machine learning algorithms, the root cause identification stage comprising: clustering the data from the disparate sources and the contextual information, identifying network events, building a probability tree comprising probabilities that a particular cause is the root cause of a network event; traversing the probability tree and updating the probabilities when conditions are met; and determining a root cause for the network event; and
upon determining, by the intelligence layer, that a predetermined condition is met or a predetermined threshold is exceeded, providing a notification to the first network element,
wherein the disparate sources include two or more network elements of the plurality of network elements,
wherein the contextual information includes information on subscribers and information on the network elements,
wherein the information on subscribers includes information on subscribers' provisioning information, and
wherein the notification which comprises information about the root cause when the predetermined condition is met or the predetermined threshold is exceeded, and includes information that is operative to:
adjust a performance of the first network element by setting said first network element in low power mode based on the battery status; or
adjust the connection to the communication network by assigning resources to the connection based at least on the application level information, the network element category and the maximum transmission bitrate.

2. The computer system of claim 1, wherein the storage device further includes an automation layer and the notification is provided by the automation layer.

3. The computer system of claim 1, wherein the notification is provided to one or more other network elements.

4. The computer system of claim 1, wherein execution of the program further configures the computer system to perform acts comprising:
upon determining that a group of other network elements in an area of the first network element meet the predetermined condition or exceed the predetermined threshold, automatically sending the notification to the network elements to the group of other network elements.

5. The computer system of claim 1, wherein the contextual information includes a type of the data plan of a subscriber of the network, a type of the first network element, or both.

6. The computer system of claim 1, wherein the data from the disparate sources includes a subscriber radio trace, an operations subsystem (OSS), a customer care record, billing information, an application performance monitoring report, or a combination thereof.

7. The computer system of claim 1, wherein at least some of the disparate sources provide data to the processing layer, which is based on the local knowledge of the network of the at least some disparate sources, respectively.

8. The computer system of claim 1, wherein the disparate sources comprise network elements from one or more radio access networks.

9. The computer system of claim 1:
wherein the analyzing by the intelligence layer includes considering a network element subscriber's predetermined preferences, limitations, plan, and type of network element, and
wherein the network element is a mobile device that is subscribed to be used on the network.

10. The computer system of claim 1, wherein execution of the program further configures the computer system to perform acts comprising:
making the contextual information available to the first network element and the other network elements before analyzing the information.

11. The computer system of claim 1, wherein the contextual information is provided to the first network element via a query performed by the first network element to the measurements megastore via an open application program interface (API).

12. The computer system of claim 1, wherein:
the network element is a resource management module; and
the notification is operative to adjust a scheduler, a link adaptation, or a flow control of the resource management module, or a combination thereof.

13. The computer system of claim 1, wherein the notification is operative to display on a user interface of the first network element that the first network element needs service.

14. The computer system of claim 1, wherein the contextual information is used to adjust an admission control, a scheduler, a link adaptation, or a power control procedure of the first network element, or a combination thereof.

15. The computer system of claim 1, wherein the notification is provided to a network administrator in real time.

16. The computer system of claim 1, wherein the data processing of the data processing layer is performed in real time.

17. The computer system of claim 1, wherein:
the notification is operative to place a restriction on one or more network elements; and
the restriction is lifted after a threshold time has elapsed or upon a new notification operative to remove the restriction is sent to the one or more network elements.

18. The computer system of claim 1, wherein the measurements megastore uses massive parallel processing technology of Hadoop, Storm, Spark, or a combination thereof.

19. The computer system of claim 1, wherein execution of the program further configures the computer system to perform acts comprising:
machine learning via one or more clustering models performed on a pre-determined training set by the intelligence layer and operative to identify patterns and trends in the data from the disparate sources and the contextual information.

20. A network element comprising: a processor;
a network interface coupled to the processor configured to enable communications via a communication network comprising a plurality of network elements, each network element being a user equipment, a base station, a gateway, a server, a management entity, or a network function;
a storage device; and
a program stored in the storage device, wherein execution of the program by the processor configures at least one network element of the plurality of the network elements to perform acts comprising:
determining local radio resources on the network;
receiving contextual information from a measurements megastore, wherein the contextual information is related to radio resources of other network elements on the network and includes information on subscribers, the contextual information comprising at least:
application level information extracted via Deep Packet Inspection (DPI), a category of at least one of the other network elements selected from: smart-phone, tablet, laptop or personal health monitoring device, and
capabilities of the at least one of the other network elements, including maximum transmission bitrate and battery status;
wherein the information on subscribers includes information on subscribers' provisioning information,
analyzing the data from the contextual information by the intelligence layer for finding patterns, trends or both, incorporating a root cause identification stage by using machine learning algorithms, the root cause identification stage comprising: clustering the contextual information, identifying network events, building a probability tree comprising probabilities that a particular cause is the root cause of a network event; traversing the probability tree and updating the probabilities when conditions are met; and determining a root cause for the network event, and upon determining, by the intelligence layer, that a predetermined condition is met or a predetermined threshold is exceeded, providing a notification to the first network element, which comprises information about the root cause when the predetermined condition is met or the predetermined threshold is exceeded;
adjusting a modulation and a coding of a transmission of the network element based on the local radio resources and the received contextual information and adjusting the resources assigned to the communication network based at least on the application level information, the network element category and the maximum transmission bitrate or adjusting a performance of the first network element by setting said first network element in low power mode based on the battery status.

21. The network element of claim 20, wherein the measurements megastore uses massive parallel processing technology of Hadoop, Storm, Spark, or a combination thereof.

22. The network element of claim 20, wherein execution of the program further configures the network element to perform acts comprising:
receiving one or more notifications from a data framework associated with the measure measurements megastore, wherein the one or more notifications are based on an analysis of the contextual information for patterns and trends; and
assigning one or more resources of the network element based on the notification from the data framework.

23. The network element of claim 20, wherein execution of the program further configures the network element to perform acts comprising:
providing the determined local radio resources to the measurements megastore via the network.

* * * * *